(12) United States Patent
Andrei et al.

(10) Patent No.: US 6,859,810 B2
(45) Date of Patent: Feb. 22, 2005

(54) DECLARATIVE SPECIFICATION AND ENGINE FOR NON-ISOMORPHIC DATA MAPPING

(75) Inventors: Cezar Christian Andrei, Bellevue, WA (US); Adam Bosworth, Mercer Island, WA (US); David Bau, III, Gladwyne, PA (US)

(73) Assignee: BEA Systems, Inc., San Jose, CA (US)

( * ) Notice: Subject to any disclaimer, the term of this patent is extended or adjusted under 35 U.S.C. 154(b) by 447 days.

(21) Appl. No.: 10/150,436

(22) Filed: May 17, 2002

(65) Prior Publication Data

US 2003/0110177 A1 Jun. 12, 2003

Related U.S. Application Data

(60) Provisional application No. 60/339,379, filed on Dec. 10, 2001.

(51) Int. Cl.[7] .............................................. G06F 17/30
(52) U.S. Cl. .................................................... 707/102
(58) Field of Search ........................................ 707/102

(56) References Cited

U.S. PATENT DOCUMENTS

| | | | |
|---|---|---|---|
| 5,812,768 A | 9/1998 | Page et al. | |
| 5,970,490 A | 10/1999 | Morgenstern | |
| 6,070,184 A | 5/2000 | Blount et al. | |
| 6,209,018 B1 | 3/2001 | Ben-Shachar et al. | |
| 6,226,675 B1 | 5/2001 | Meltzer et al. | |
| 6,230,160 B1 | 5/2001 | Chan et al. | |
| 6,243,091 B1 * | 6/2001 | Berstis ........................ | 345/839 |
| 6,253,252 B1 | 6/2001 | Schofield | |
| 6,314,429 B1 | 11/2001 | Simser | |
| 6,362,817 B1 * | 3/2002 | Powers et al. ............... | 345/419 |
| 6,404,445 B1 | 6/2002 | Galea et al. | |
| 6,449,620 B1 | 9/2002 | Draper et al. | |
| 6,714,939 B2 * | 3/2004 | Saldanha et al. ............ | 707/102 |
| 6,754,884 B1 * | 6/2004 | Lucas et al. ................. | 717/108 |
| 2001/0029604 A1 | 10/2001 | Dreyband et al. | |
| 2001/0047385 A1 | 11/2001 | Tuatini | |
| 2002/0073236 A1 | 6/2002 | Helgeson et al. | |
| 2002/0099738 A1 | 7/2002 | Grant | |
| 2002/0120459 A1 * | 8/2002 | Dick et al. ...................... | 705/1 |
| 2002/0143816 A1 * | 10/2002 | Geiger et al. ................ | 707/513 |
| 2002/0184264 A1 | 12/2002 | Berg et al. | |

OTHER PUBLICATIONS

Banbara et al., "Translating a Linear Logic Programming Language into Java," Electronic Notes in Theoretical Computer Science, 1999, pp. 1–15.

Binding et al., "Generation of Java Beans to Access XML Data," Proceedings of the first International Conference on Web Information Systems Engineering, Jun. 2000, vol. 2, pp. 143–149.

(List continued on next page.)

*Primary Examiner*—Wayne Amsbury
(74) *Attorney, Agent, or Firm*—Schwabe, Williamson & Wyatt, P.C.

(57) ABSTRACT

A mapping engine is provided to populate data elements of a first data structure of a first data representation with values of corresponding data elements of a second data structure of a second data representation, in accordance with at least a mapping specification. The two data structures may have different data shapes. The mapping specification may have a number of data element and data attribute mapping directives, including repeating data items. A population operation in a reversed direction may also be performed using the same mapping specification. The mapping specification may also specify an external mapping specification for a subset of the mapping operations. The external mapping specification may comprise unidirectional function pairs. In one embodiment, the mapping engine performs order dependent mapping facilitating the use of separate mapping rules for different instances of the same data element based upon the relative position of the data element instances within an input data structure.

108 Claims, 18 Drawing Sheets

OTHER PUBLICATIONS

Chandramouli, R., "Application of XML Tools for Enterprise–Wide RBAC Implementation Tasks," Proceedings of the 5$^{th}$ ACM Workshop on Role–based Access Control, Jul. 2000, pp. 11–18.

Ha et al., "Mapping XML Documents to the Object–Relational Form," IEEE, Jun. 12, 2001, pp. 1757–1761.

Imamura et al., "Mapping between ASN.1 and XML," Jan. 2001, Proceedings of the 2001 Symposium on Application and the Internet, pp. 57–64.

Rundensteiner et al., "Maintaining Data Warehouses over Changing Information Sources," Communications of the ACM, Jun. 2000, vol. 43, No. 6, pp. 57–62.

Sahuguet et al., "Looking at the Web through XML glasses," Proceedings of the 1999 IFCIS International Conference on Cooperative Information Systems, Sep. 1999, pp. 148–159.

Suzuki et al., "Managing the Software Design documents with XML," ACM, 1998, pp. 127–136.

Wallace et al., "Haskell and XML: Generic Combinations or Type–Based Translation?" ACM, 1999, pp. 148–159.

Zwol et al., "The Webspace Method: On the Integration of Database Technology with Multimedia Retrieval," Proceedings of the 9$^{th}$ International Conference on Information and Knowledge Management, Nov. 2000 pp. 438–445.

* cited by examiner

```
                                                                    40
<ORDER xmlns:xm="http://bea.com/map">
    <CUSTOMER ID="{c.id}" >
        <NAME>          {c.name}        </NAME>
        <SHIPADDRESS>   {c.address}     </SHIPADDRESS>
    </CUSTOMER>
    <ITEM xm:multiple = "i in items">
        <DESCRIPTION>   {i.desc}        </DESCRIPTION>
        <QUANTITY>      {i.qty}         </QUANTITY>
    </ITEM>
</ORDER>
```

FIG. 4a

```
Class Customer {
    String name;
    String address;
}

Class Item {
    String desc;
    int qty;
}

Process Order (Customer c, Item [ ] items)
```

FIG. 4b

```
<ORDER>
    <CUSTOMER ID = "1" >
        <FAVCOLOR>      BLACK           </FAVCOLOR>
        <NAME>          JASON           </NAME>
        <SHIPADDRESS>   1ST STREET      </SHIPADDRESS>
    </CUSTOMER>
    <ITEM>
        <DESCRIPTION>   DVD PLAYER      </DESCRIPTION>
        <QUANTITY>      1               </QUANTITY>
    </ITEM>
    <ITEM>
        <DESCRIPTION>   LORD OF RINGS   </DESCRIPTION>
        <QUANTITY>      5               </QUANTITY>
    </ITEM>
</ORDER>
```

FIG. 4c

DECLARATIVE SPECIFICATION AND ENGINE FOR NON-ISOMORPHIC DATA MAPPING

RELATED APPLICATIONS

This patent application claims priority to Provisional Patent Application No. 60/339,379 filed on Dec. 10, 2001, which is hereby fully incorporated by reference.

BACKGROUND OF THE INVENTION

1. Field of the Invention

The present invention generally relates to the field of data processing. More specifically, the present invention relates to non-isomorphic data mapping.

2. Background Information

EXtensible Markup Language or 'XML' is rapidly emerging as the de-facto standard for describing data structures to be transmitted between software applications and web services. While most software applications and web services are written in modern programming languages, such as Java or C++, none of these programming languages provide native support for representing and manipulating XML data structures. Consequently, programmers are either forced to develop or adopt external software packages for representing and manipulating XML data structures within the context of their applications and web services, or to attempt to map XML data structures to programming language data structures of their applications and web services or vice versa.

Existing processes for mapping between XML and programming language data structures focus on isomorphic mapping of the data where, although the data may be represented differently (e.g. as objects of a class versus nodes of a tree), the corresponding data structures are nonetheless required to maintain same relative shape. More specifically, in an isomorphic mapping, a one-to-one correspondence between both the elements and the element relationships of the data structures involved in the mapping is required.

FIG. 1 illustrates an example of an isomorphic relationship between data structures corresponding to three applications in accordance with the prior art. With reference to FIG. 1, it can readily be seen that the data structures associated with applications A, B and C, as well as the data structure of the XML message used to communicate between the applications A, B and C, all maintain the same general data shape. That is, for every element (represented by circles) of the data structure associated with application A, there exists a corresponding element in the respective data structures of applications B, and C as well as the data structure of the XML message. In addition, for every relationship (represented by lines) between elements of the data structure associated with application A, there exists a corresponding relationship in the respective data structures of applications B, and C as well as the data structure of the XML message.

This isomorphic relationship between the respective data structures required by prior art mapping solutions results in a tight coupling between the associated applications. In an environment where different people, on different schedules and platforms, build applications for different purposes (i.e. such as the Internet), a change in the code of one application (i.e. changing the shape of one of its data structures) can cause the other applications to break at one or more integration points. Even if the code of the other applications were modified to adapt to the first application's change, the fixes would only be temporary until another application was changed. Moreover, any such adaptive modification made to an application's code would likely require the services of a programmer causing additional costs and delay to be incurred.

BRIEF DESCRIPTION OF DRAWINGS

The present invention will be described by way of exemplary embodiments, but not limitations, illustrated in the accompanying drawings in which like references denote similar elements, and in which:

FIG. 4a illustrates an example data mapping specification annotated with mapping directives in accordance with one embodiment of the invention;

FIG. 4b illustrates sample Java code defining an internal data structure to be populated through the non-isomorphic mapping process of the present invention;

FIG. 4c illustrates an example XML instance document containing a data structure with data elements to be mapped to the programming language data objects of FIG. 4b based upon the data mapping specification of FIG. 4a, in accordance with one embodiment of the invention;

FIG. 9 illustrates various stages of a target stack including search context derived from the data mapping specification of FIG. 4a;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as receiving, analyzing, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

The term "data structure" is used herein to describe a wide variety of data organizations and relationships corresponding to a variety of programming and data representation languages. For example, a data structure may refer to a hierarchical association between data elements of an XML representation, or to one or more objects and/or classes of a procedural programming language such as Java. Similarly, the terms "data element" and "data object" are used interchangeably herein to refer to data items within a given data structure.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
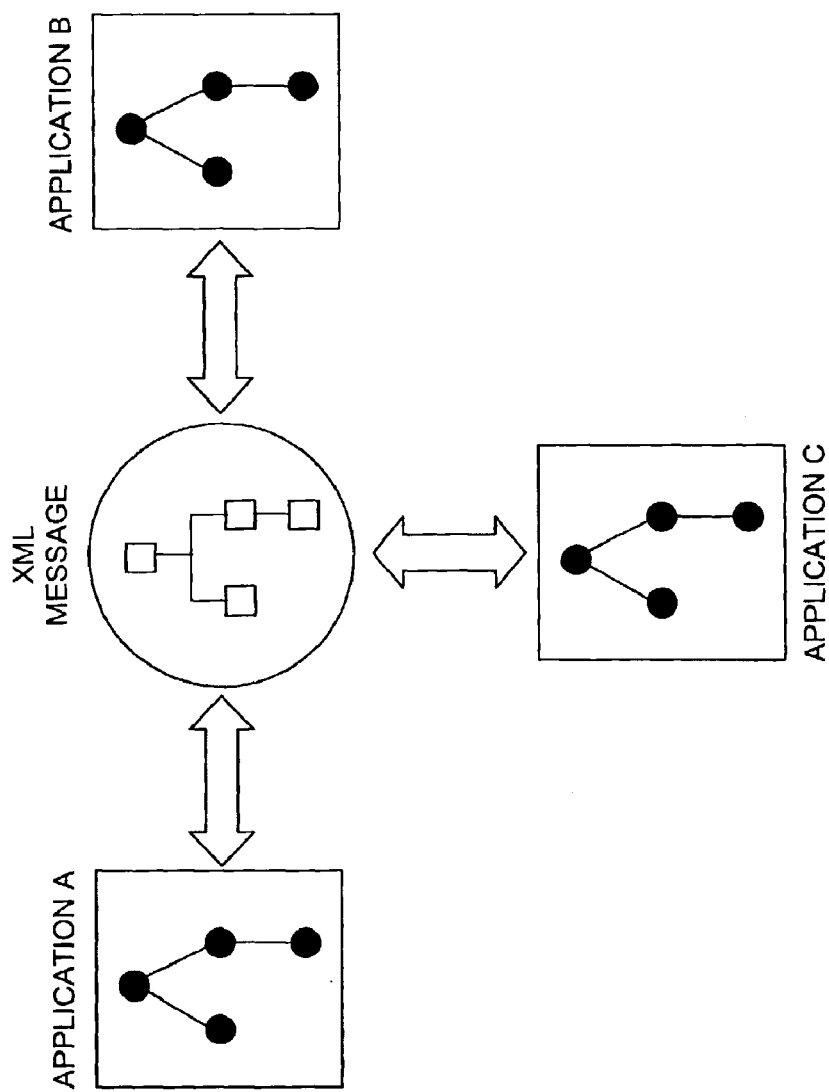
FIG. 1 illustrates an example of an isomorphic relationship between corresponding data structures of three applications in accordance with the prior art.
Figure 2:
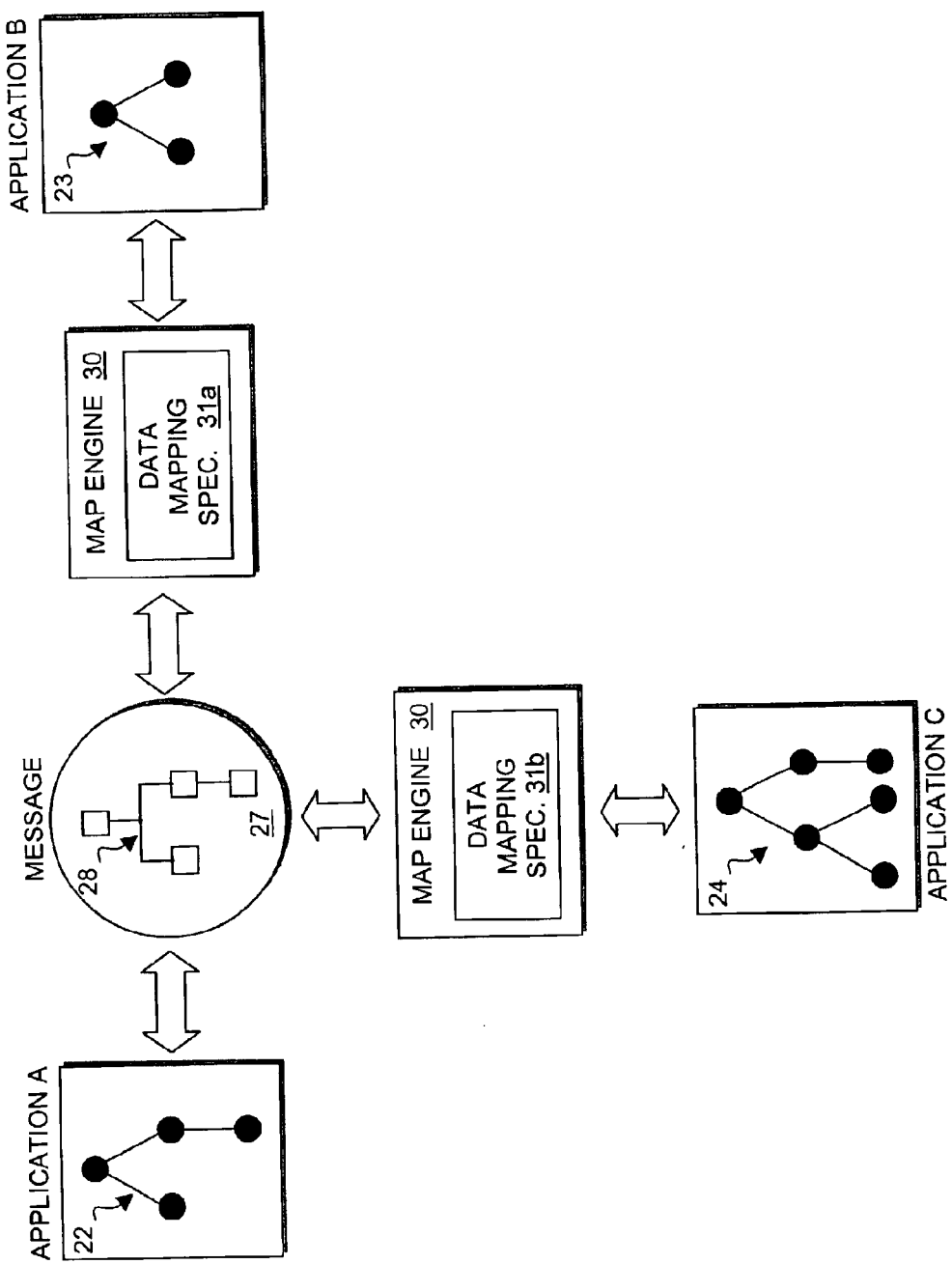
FIG. 2 illustrates an overview of the present invention.

Referring now to FIG. 2, wherein an overview of the present invention is illustrated. As shown, map engine 30 is equipped to perform non-isomorphic data mapping between differently shaped data structures such as data structures 22, 23, and 24 associated with applications A, B and C, respectively. In the illustrated embodiment, applications A, B and C exchange information with one another via map engine 30, and message 27 having data structure 28. In accordance with one aspect of the present invention, if the code of one of applications A, B and C were to be modified so as to change the shape of the corresponding data structure (e.g., adding a new data item), the remaining applications would not break, as a 1-to-1 correspondence between elements of the respective data structures is not required due to the presence of map engine(s) 30. In accordance with one embodiment of the invention, map engine 30 is equipped to perform bi-directional data mapping (i.e. both a mapping from a first data structure to a second differently shaped data structure, and a mapping from the second data structure to the first data structure) based upon a single declarative data mapping specification (such as, 31a or 31b). In accordance with another aspect of the invention, data mapping specifications 31a and 31b can be generated from one or more instances of an input data structure annotated to identify the data elements to be mapped to and from the second data structure. In yet another aspect of the invention, data mapping specifications 31a and 31b can delegate portions of their specifications to external data mapping specifications while still maintaining bi-directional mapping characteristics. In one embodiment, the external data mapping specification may be another bi-directional map in accordance with the teachings of the present invention or a pair of unidirectional (e.g., procedural) mapping functions. In yet another aspect of the invention, map engine 30 is equipped to perform order-dependent data mappings whereby the order in which XML data occurs can be used to determine how it will be mapped. For example, the first instance of a data element named "LOCATION" can be mapped to a data object named "sender-location", while the second instance of the "LOCATION" data element can be mapped to a different data object named "receiver-location". In one embodiment of the invention, message 27 includes an XML data structure including data elements corresponding to application A, that are mapped by way of map engine 30 of the present invention to Java programming language data objects associated with applications B and C.

Map Engine

Figure 3:
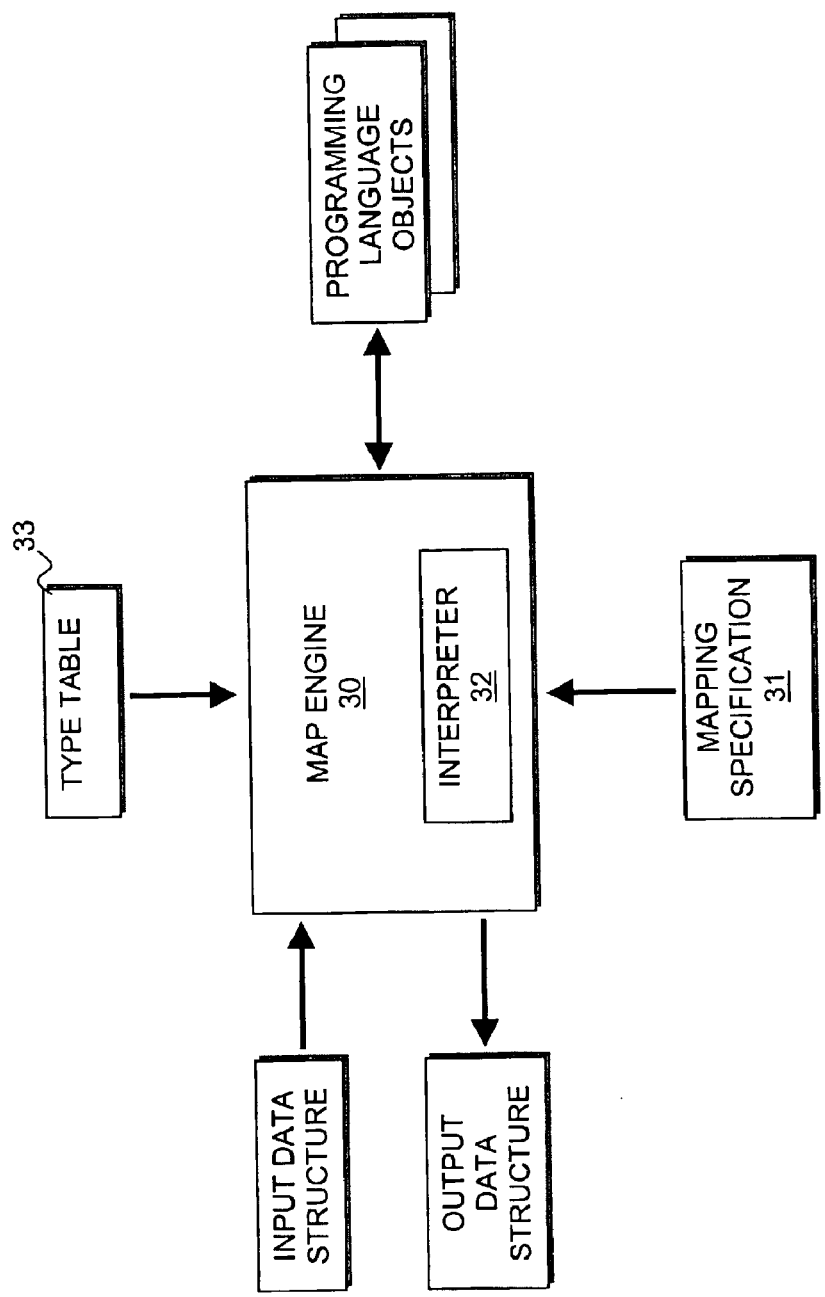
FIG. 3 illustrates the map engine of FIG. 2 and its operating environment in further detail, in accordance with one aspect of the present invention.

FIG. 3 illustrates the map engine of FIG. 2 and its operating environment, in further detail, in accordance with one embodiment of the present invention. In the illustrated embodiment, map engine 30 receives an input data structure and maps one or more data elements of the received input data structure to one or more data elements of a set of programming language data objects, based at least in part on data mapping specification 31. Likewise, map engine 30 is equipped to map one or more of the programming language data objects back to one or more elements of an output data structure based upon the same data mapping specification 31, e.g. after using the programming language data objects to manipulate the data. In one embodiment, map engine 30 receives one or more XML document fragments, which it maps to one or more Java programming language data objects, based upon an annotated XML instance document, used as the data mapping specification.

In the illustrated embodiment, map engine 30 is equipped with interpreter 32 to interpret data mapping specification 31 that has been annotated with mapping directives in accordance with yet another aspect of the present invention. In one embodiment, interpreter 32 includes a parser (not shown) that parses data mapping specification 31 prior to receiving an input data structure. In one embodiment, the parser reads and parses data mapping specification 31 in accordance with known parsing techniques to identify one or more expressions and/or sub-expressions contained therein based upon predetermined syntax, semantics and/or grammar. In one embodiment, a read operation is defined so as to cause the parser to read one of a start tag, attribute, text value, or end tag from an XML input data structure. In one embodiment, interpreter 32 continues to read and evaluate expressions until the entire data mapping specification 31 has been read and parsed. Moreover, interpreter 32 may optionally apply one or more optimizations to the resulting operations specified by the expressions analyzed. The optimizations may be any one or more of the applicable optimization techniques known in the art.

In the illustrated embodiment, map engine 30 is shown to include interpreter 32. In one embodiment, map engine 30 may be invoked by a host compiler/interpreter via an application programming interface (API) (e.g. with type table 33 as a portion of the API). In such an embodiment, the host compiler may pass information describing the names and types of the host programming language objects participating in the mapping process. For example, the host compiler may derive (e.g. from the symbol table) a type-table that is passed to map engine 30 describing the names and types of objects map engine 30 should build from the input data structure or should use to build the output data structure.

Mapping Specification

In one embodiment, interpreter 32 is equipped to operate in accordance with a grammar to identify one or more syntactical constructs within a data mapping specification indicating that a data mapping is to be performed. Although the following description includes examples of a syntax that can be used to perform data mappings in accordance with various embodiments of the present invention, it should be noted that other syntaxes might similarly be used without departing from the spirit and scope of the invention. Furthermore, the following data mapping examples illustrate data mappings between XML and Java language elements, however, the examples are not in any way intended to be limiting on the applicability of the invention solely to XML-Java and Java-XML mappings. The bi-directional non-isomorphic mapping of the present invention may be practiced on data elements of any two of a wide range of data representations.

In one embodiment of the invention, a unique XML map namespace that is known by interpreter 32 to be associated with the data mapping syntax described below is declared within data mapping specification 31. In one embodiment, all tags, text attributes, and attribute values that are not declared to be in the map namespace are treated as literal content. In one embodiment, elements and attributes are indicated as being part of the map namespace with a namespace prefix (e.g., xm) associated with a unique namespace identifier (e.g., <hypertext transfer protocol>:// bea.com/map). In addition, a shorthand notation, such as a set of curly braces surrounding an element (e.g., "{ . . . }") can be used to represent elements or attributes in the namespace. Likewise, other shorthand notations can be used so long as the interpreter is equipped to associate the shorthand notation with the corresponding elements or attributes.

The <xm:value> tag is used in the data mapping specification of the present invention to specify to map engine 30 to derive the value of a specific programming language object from a given element value in the XML data structure or derive the value of a given element from a specific programming language object, depending upon the direction of the mapping to be performed. In one embodiment, the <xm:value> tag has an attribute "obj" that specifies the name of a single programming language object, optionally preceded by it's type, as follows:

```
<NAME><xm:value obj="java.lang.String name"/></NAME>
```

Alternatively, the <xm:value> tag may equivalently be represented using the shorthand notation as follows:

```
<NAME>{java.lang.String name}</NAME>
```

In either case, when a XML data structure is received via an XML instance document, the information contained between the <NAME> and </NAME> tags is mapped to the Java object "name" that is of type java.lang.String. If the type of the object is omitted, the object type can be derived from the type-table provided e.g., by the host environment.

The <xm:attribute> tag has similar syntax and semantics to that of the <xm:value> tag described above, except that the <xm:attribute> tag matches attribute values instead of element values and includes a "name" attribute to specify the attribute, which value is to be mapped. The <xm:attribute> tag applies to the value of the attribute with the specified name in the closest parent tag. For example, the shorthand directive of

```
<TAXID type="{taxidtype}">{taxid}</TAXID>,
``` is equivalent to the fully expressed directive of:

```
<TAXID>
    <xm:attribute name="type" obj="taxidtype">
    <xm:value obj="taxid">
</TAXID>,
``` and they would both map to/from a data element of an XML data structure of the form:

```
<TAXID type="EIN">54-231422</TAXID>.
```

Furthermore, an <xm:attribute> tag is considered to be a child of a literal tag on which the attribute is to be applied.

The xm:multiple attribute is used to specify mapping of data within repeating tags in an XML document to corresponding data collections in a programming language, such as Java, as follows:

```
<ORDER xm:multiple="String desc in descriptions, int qty in quantities">
    <DESCRIPTION>{desc}</DESCRIPTION>
    <QUANTITY>{qty}</QUANTITY>
</ORDER>
```

Using the map above, map engine 30 would map the contents of each ORDER element to items in the descriptions and quantities data collections. Specifically, the value of each DESCRIPTION element would be mapped to a corresponding item (desc) in the description collection and the value of each QUANTITY element would be mapped to a corresponding item (qty) in the quantities collection. The above example facilitates exchange of data with data elements of the following XML document fragment:

```
<ORDER>
    <DESCRIPTION>Red ball</DESCRIPTION>
    <QUANTITY>4</QUANTITY>
</ORDER>
<ORDER>
    <DESCRIPTION>Blue ball</DESCRIPTION>
    <QUANTITY>1</QUANTITY>
</ORDER>
```

The <xm:use> tag is used to specify an external mapping specification to be used to specify/perform a subset of the mapping. In one embodiment, the xm:use tag takes a single argument identifying the name and signature (i.e., the list of objects on which it operates) of the external map as follows:

```
<xm:use call="MyScript(int a, MyStructure b)">
```

The external map can be another bi-directional map or can be composed of a pair of unidirectional functions e.g. written in a procedural programming language such as Java. For example, in the <xm:use . . . > example above, the map referred to in the 'call' attribute may refer to a programming language class that defines two methods, one named 'toXML' that can convert programming language objects to XML data elements, and another named 'fromXML' that can convert XML data elements to programming language objects. In one embodiment, the toXML and fromXML methods would have the following signatures:

DocumentFragment toXML ([an argument list matching the xm:use referenced types]);

Object[ ] fromXML (Node);

In the toXML case, the arguments listed in the <xm:use> tag are sent, in order, as arguments to the toXML method of the class. With the added flexibility of the xm:use directive, it is possible to break complex mapping problems into simpler sub-problems and use procedural code for sub-problems.

FIG. 4a illustrates an example data mapping specification annotated with mapping directives in accordance with one embodiment of the invention. FIG. 4b illustrates sample Java code defining an internal data structure containing objects to be populated through the non-isomorphic mapping process of the present invention. FIG. 4c illustrates an example XML instance document containing data elements to be mapped to the programming language objects of FIG. 4b based upon the data mapping specification of FIG. 4a, in accordance with one embodiment of the invention. As shown in FIG. 4a, map specification 40 includes XML elements annotated with various "value", "attribute", and "multiple" mapping directives appearing in the form discussed above (e.g. <xm:multiple>, { . . . }, etc.). Based upon the illustrated data mapping specification of FIG. 4a, data associated with the NAME element of the input data structure (i.e. XML instance document) of FIG. 4C will be mapped to the "name" member of the object "c" of type Customer by the map engine of the present invention. Similarly, data associated with the SHIPADDRESS element of the instance document is mapped to the "address" member of the object "c" of type Customer by the map engine.

Map specification 40 further illustrates the use of an xm:multiple directive that is associated with a repeating "item" element within the XML instance document. Accordingly, for each <ITEM> element found within the instance document, a new member "i" of a Java List entitled "items" (e.g. as specified by the Process Order method of FIG. 4b) is created. Moreover, the data found to exist between each occurrence of the <ITEM></ITEM> tag pair is mapped to members of the new item "i" in the List. Within the ITEM element of the instance document exist two children elements entitled "DESCRIPTION" and "QUANTITY". Based upon map specification 40, the values associated with the description and quantity elements within the instance document will be mapped to the desc and qty members of an item "i" which will be added to the "items" List of FIG. 4b. While this illustration uses a Java array, the present invention may also be used with other collection types, including lists and maps.

XML-to-Objects Mapping

Figure 5:
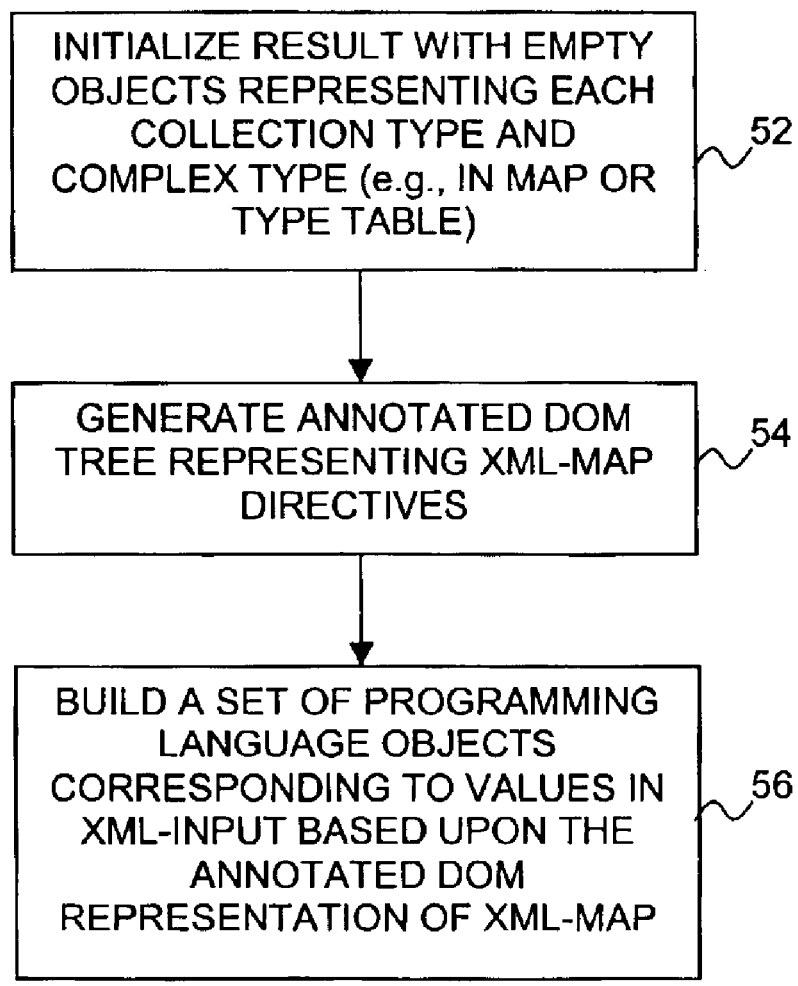
FIG. 5 illustrates one embodiment of the operational flow performed by the map engine of the present invention in mapping data elements of a XML data structure to programming language data objects.

FIG. 5 illustrates one embodiment of an operational flow performed by the map engine of the present invention in mapping XML data elements to programming language objects. To begin, the map engine initializes empty objects for each collection type and complex type appearing in the map or in a type-table e.g. provided by the host environment, block 52. Next, an annotated DOM tree representing the data mapping specification is generated, block 54. In generating the annotated DOM tree, the map engine first creates a standard DOM tree, and then annotates the DOM tree with objects representing each directive within the data mapping specification (e.g., <xm:value>). Finally, a set of programming language objects corresponding to values in the instance document are built based upon the annotated DOM representation of the data mapping specification, block 56.

Figure 6A:
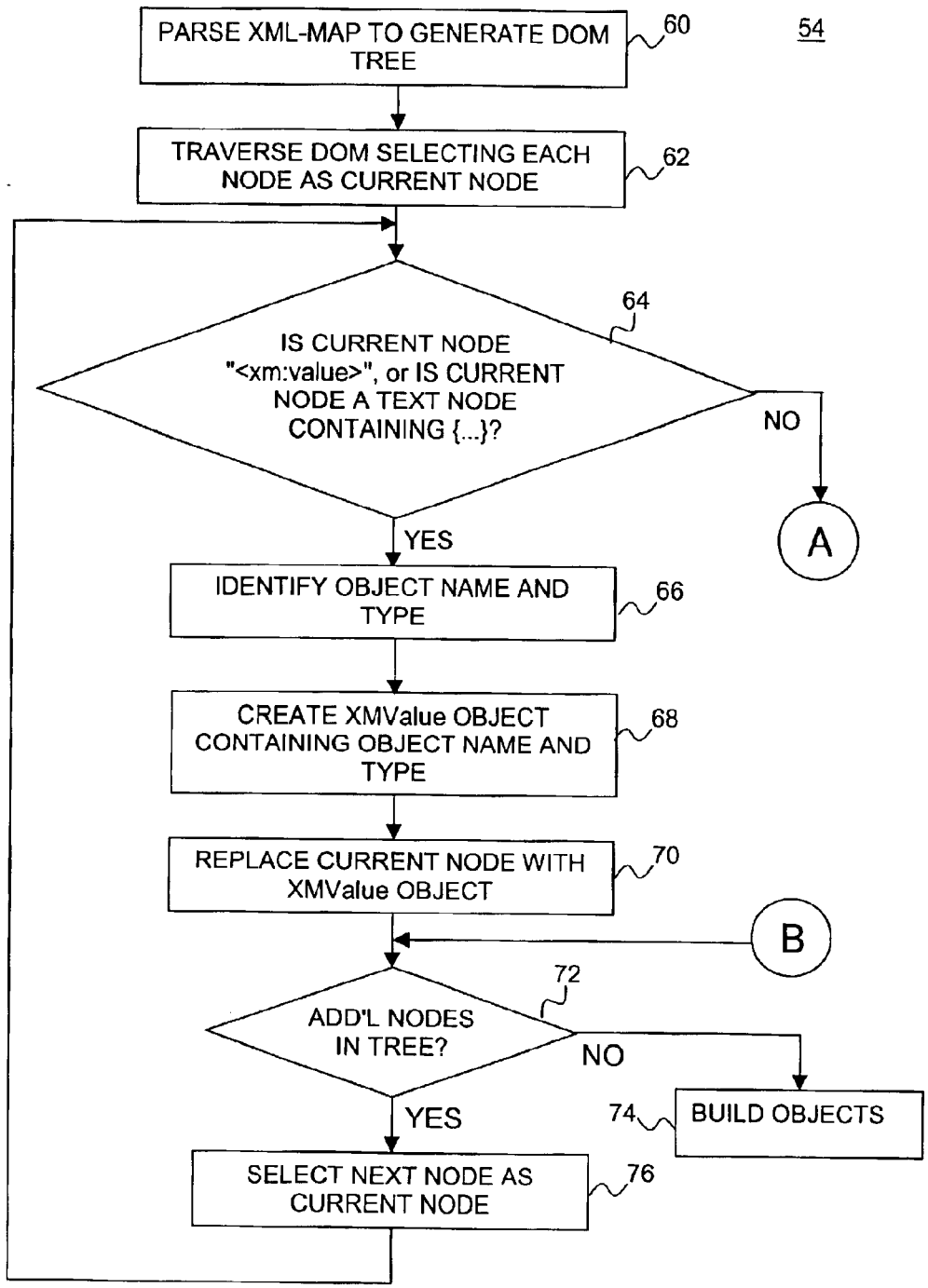
FIGS. 6a–6c illustrate one embodiment of an operational flow associated with the generation of the annotated (document object model) DOM of FIG. 5.
Figure 6B:
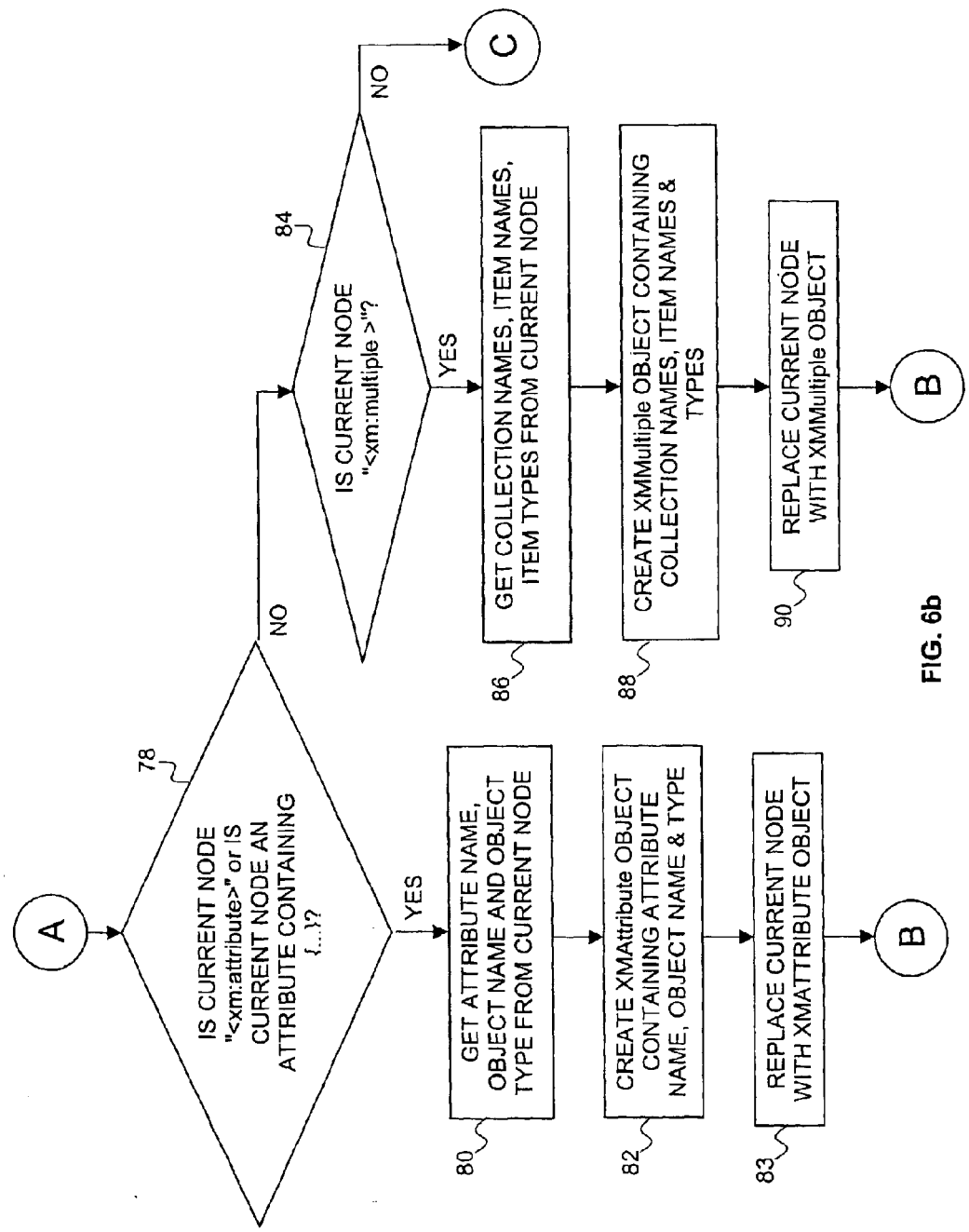
Figure 6C:
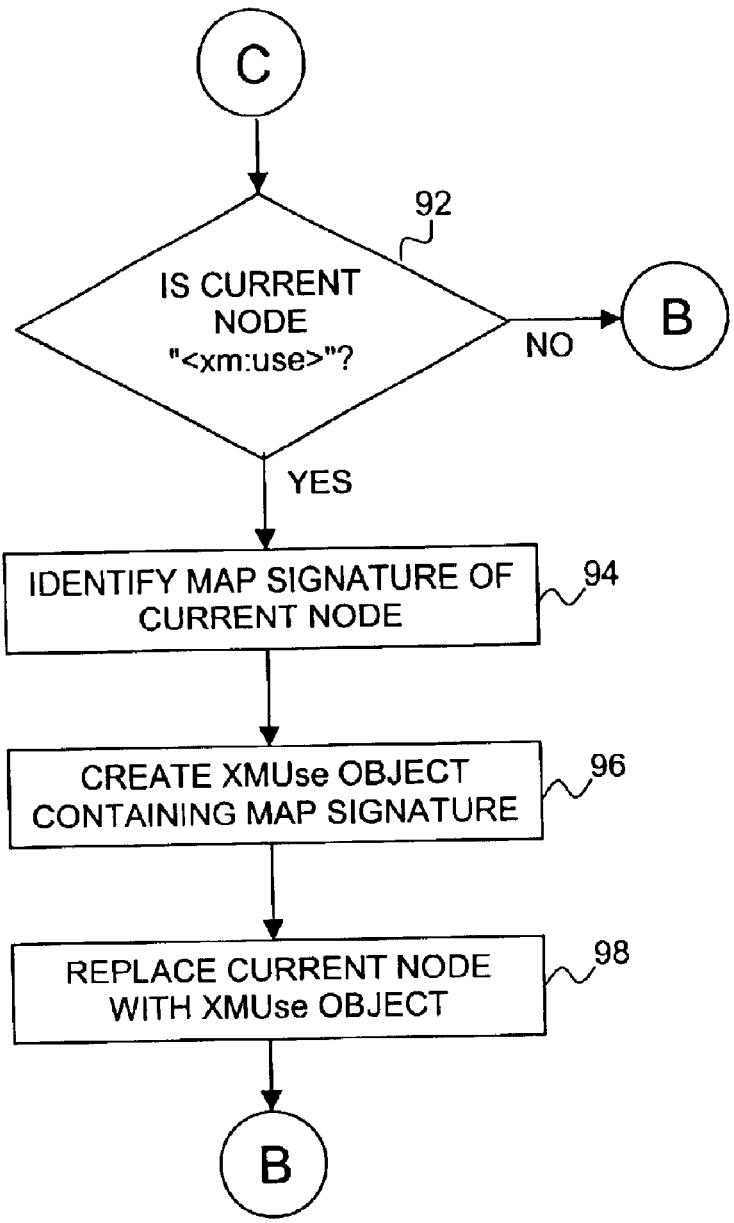
Figure 7A:
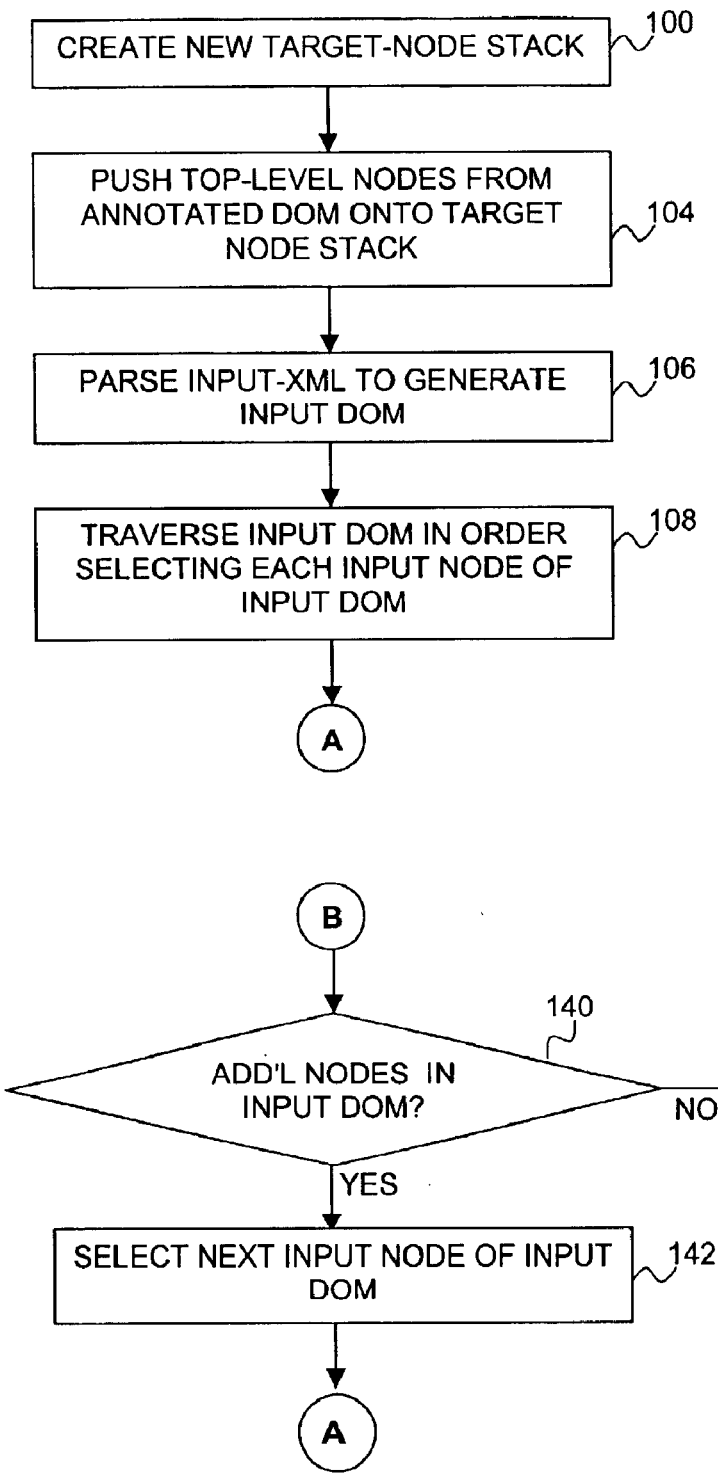
FIGS. 7a–d illustrate one embodiment of an operational flow associated with the programming language data object build process of FIG. 5.
Figure 7B:
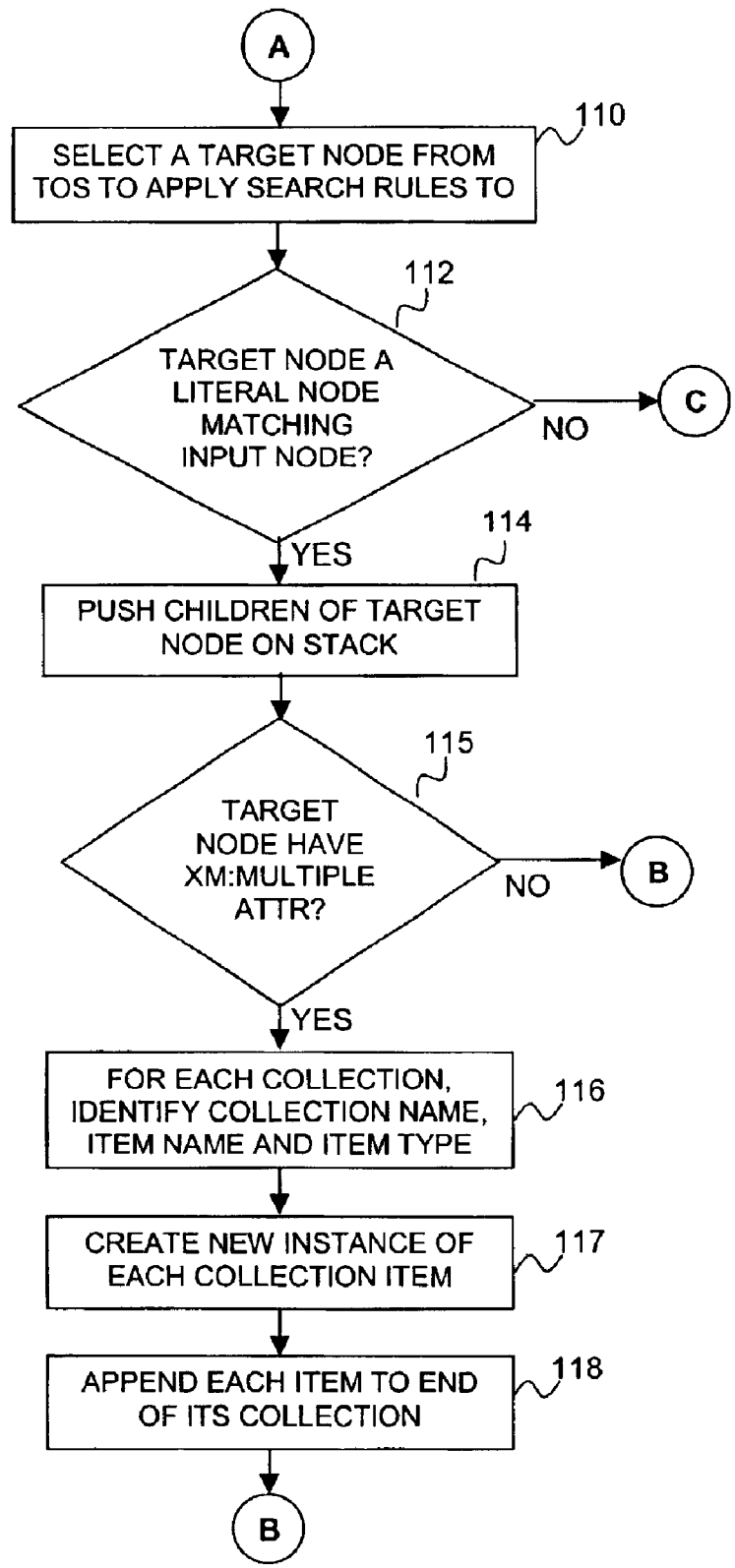
Figure 7C:
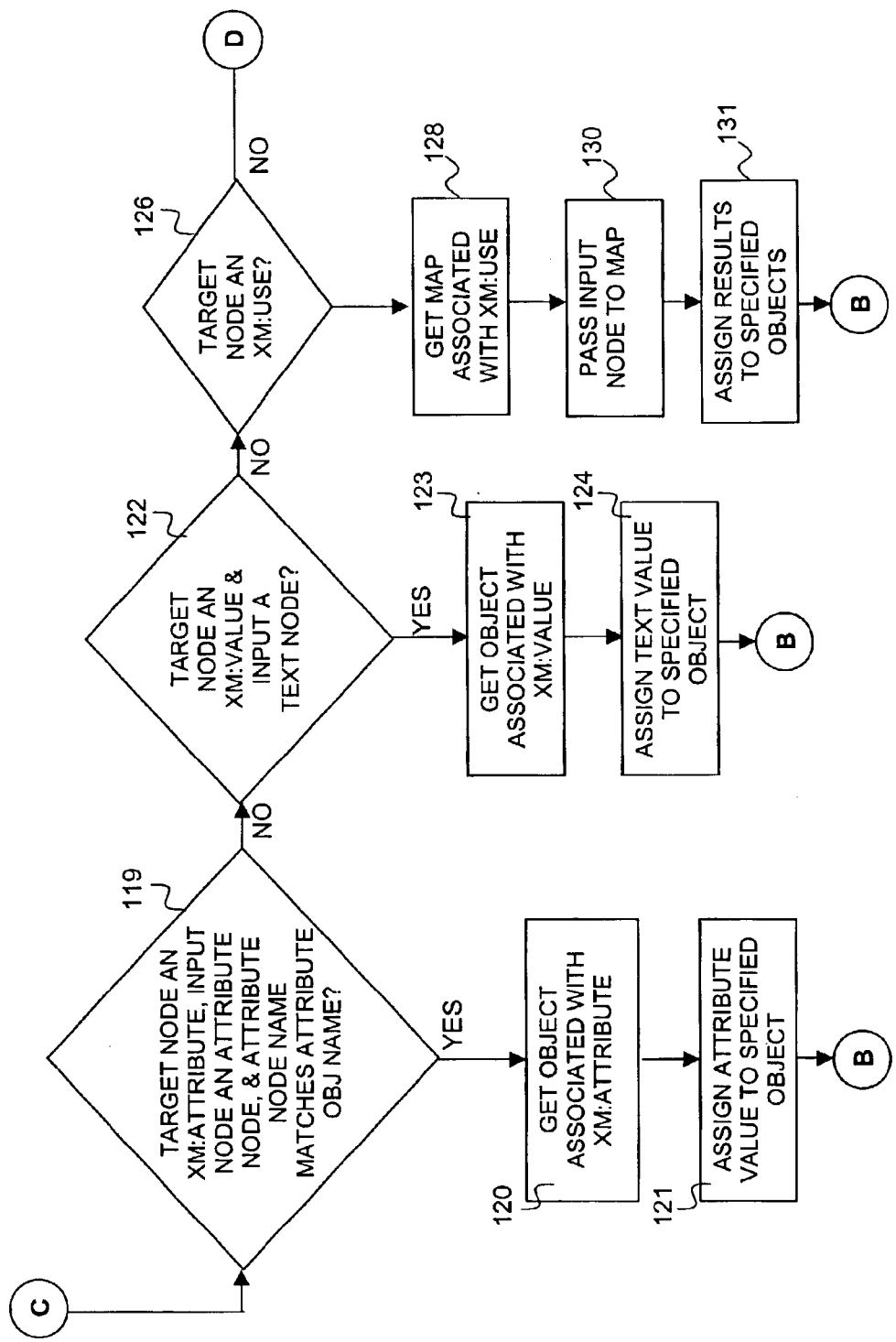
Figure 7D:
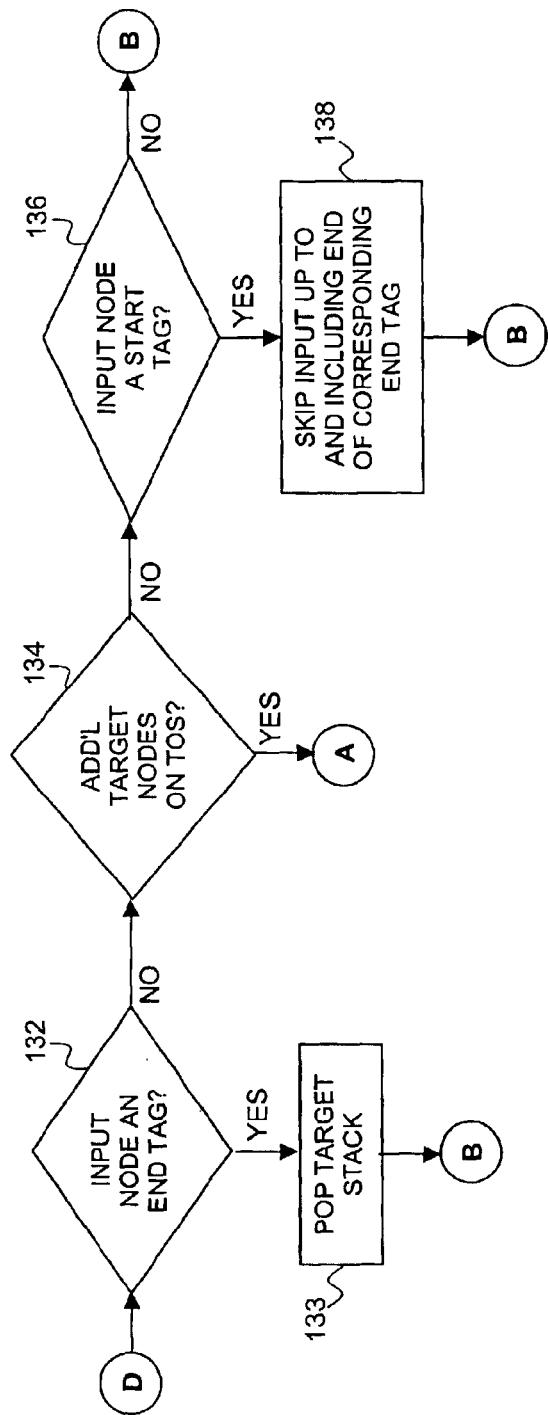

FIGS. 6a–6c illustrate one embodiment of an operational flow associated with generation of the annotated DOM tree of FIG. 5. To begin, the data mapping specification is first parsed to generate a standard DOM tree based on the elements of the data mapping specification, block 60. Next, the DOM tree is traversed in order with each node of the DOM tree being selected in turn, block 62. For each selected node, a determination is made as to whether the current node corresponds to either an <xm:value> or is a text node containing a shorthand notation such as a set of curly braces (i.e. "{ . . . }), block 64. If the current node does correspond to an <xm:value> or is a text node containing an equivalent shorthand notation, the associated object name and object type are identified, an XMValue object is created containing the object name and type, and the current node is replaced with the XMValue object, blocks 66, 68 and 70. In one embodiment, the object name may appear in the <xm:value> tag or within the curly braces, whereas the object type may be specified directly within the <xm:value> tag, within the curly braces, or within a corresponding type-table provided by the host environment. If the current node does not correspond to an <xm:value> or is not a text node containing an equivalent shorthand notation set of curly braces, block 64, a further determination is made as to whether the current node corresponds to an <xm:attribute> or is an attribute containing an equivalent shorthand notation, block 78. If so, the attribute name, object name and object type are ascertained (e.g. as described above), an XMAttribute object is created containing these items, and the current node is replaced with the XMAttribute object, block 80, 82, and 83. If the current node does not correspond to an <xm:attribute> or is not an attribute containing an equivalent shorthand notation, block 78, a determination is made as to whether the current node corresponds to an xm:multiple, block 84. If the current node corresponds to an xm:multiple directive, the collection names, item names, and item types corresponding to the xm:multiple directive are ascertained, block 86, an XMMultiple object is created containing these items, and the current node is replaced by the XMMultiple object, blocks 88, and 90. If, at block 84, a determination is made that the current node is not associated with an xm:multiple, a final determination is made as to whether the current node is associated with an <xm:use>, block 92. If so, the map signature corresponding to the current node is ascertained, an XMUse object is created containing this signature, and the current node is replaced by the XMUse object, blocks 94, 96, and 98. After the current node is replaced by the XMUse, XMMultiple, XMAttribute, or XMValue objects, or if the current node is not associated with an <xm:use>, block 92, a determination is made as to whether any additional nodes remain in the DOM tree, block 72. If additional nodes do remain in the DOM tree, the next node in order is selected as the current node, block 76, and the process continues. If additional nodes do not remain in the DOM tree, traversal of the annotated DOM tree is complete and the map engine proceeds to build a set of programming language objects corresponding to values in the XML instance document as dictated by the annotated DOM representation of the data mapping specification, block 74.

FIGS. 7a–d illustrate one embodiment of an operational flow associated with the programming language objects build process of FIG. 5. To begin, a new target node stack is created, block 100. Next, the top-level nodes of the annotated DOM are pushed onto the target node stack at block 104. At block 106, the XML instance document (i.e. input-XML) is parsed to generate an input DOM, and at block 108, the input DOM is traversed in order selecting each input node in turn. For each input node, the target nodes on the top of the target stack (TOS) are searched to determine if a corresponding search rule matches the selected input node. The search begins by selecting a target node from the top of the target stack (TOS), block 110. A determination is then made as to whether the selected target node is a literal node that matches the input node, block 112. If so, the children of the matched target node are pushed on the stack, block 114. In the event the matched target node contains a child XMMultiple object block 115, a new instance of each collection item described by the XMMultiple object is created using the associated item type, bound to the associated item name and inserted into the associated collection, blocks 116–118. Subsequent mapping operations referencing one of these item names will be performed on the instance currently bound to the item name. If the selected target node is not a literal node matching the input node, block 112, then a determination is made as to whether the target node is an XMAttribute object, the input node is an attribute node and the attribute node name matches the name contained in the XMAttribute object, block 120. If so, the object specified by the XMAttribute object is retrieved and the value associated with the attribute is assigned to the object specified by the XMAttribute object, blocks 120 and 121. If the target node is not an XMAttribute object or the input node is not an attribute node or the name of the attribute node does not match the name contained in the XMAttribute object, a further determination is made as to whether the target node is an XMValue object and the input node is a text node, block 122. If the target node is an XMValue object and the input node is a text node, the object specified by the XMAttribute object is retrieved and the value associated with the text node is assigned to the object specified by the XMValue object, blocks 123 and 124. For example, given a target node representing the mapping element <xm:value obj="customer.name">, where customer.name references a Java programming language object, block 123 would find the Java object called "customer.name", and block 124 would assign the value from the XML text node to the customer.name object. If at block 122 the target node is determined not to be an XMValue object or the input node is not a text node, a determination is made as to whether the target node is an XMUse, block 126. If the target node is an XMUse, the name of the external map is identified, block 128, the input node is passed as a parameter to the named map, block 130, and the objects returned by the map are assigned to the objects specified in the map signature, block 131. However, if the target node is not an XMUse, a determination is made as to whether the input node is an end tag, block 132. If the input node is an end tag, the target node stack is popped, block 133. If the input node is not an end tag, a determination is made as to whether additional target nodes exist on the top of the target stack (TOS), block 134. If additional target nodes exist, the next one is selected, block 110, and the search process continues at block 112. If there are no target nodes remaining to be checked, a match was not found and a determination is made as to whether the input node is an unmatched start tag, block 136. If so, the input up to and including the corresponding end tag is skipped, block 138, and a determination is made as to whether there are additional nodes in the input DOM, block 140. If there are no additional nodes in the input DOM, the process ends. If, however, there are additional nodes in the input DOM, a new input node of the input DOM is selected, block 142.

Figure 8:
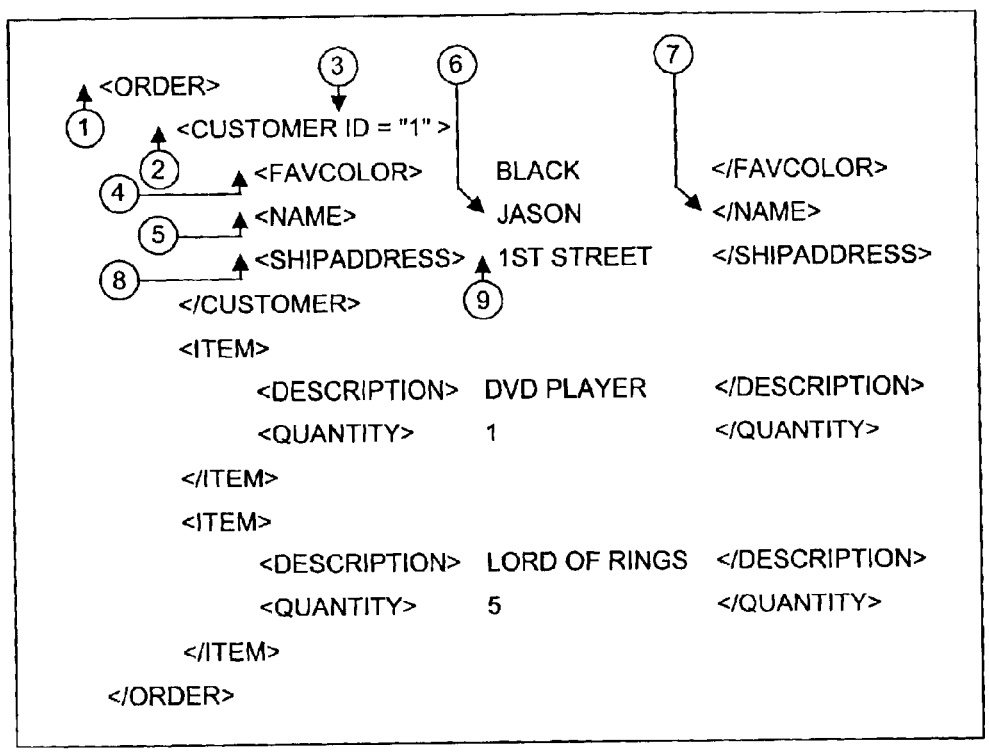
FIG. 8 illustrates the example XML instance document of FIG. 4C shown with read position indicators in accordance with one embodiment of the invention.
Figure 9:
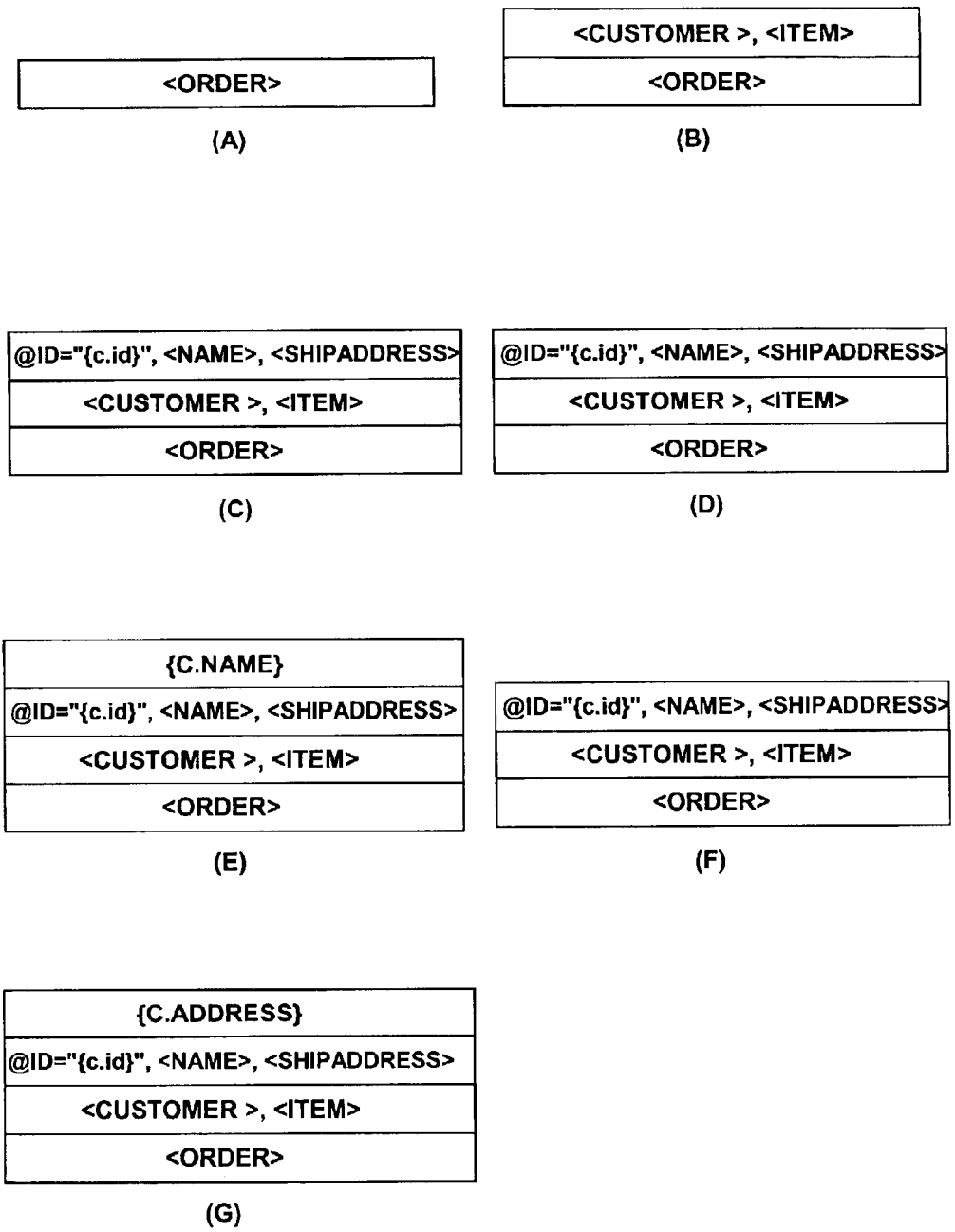

FIG. 8 illustrates the example XML instance document of FIG. 4c shown with read position indicators in accordance with one embodiment of the invention. The read position indicators are provided so as to visually indicate which input data will be read upon each successive read operation performed by the map engine. FIG. 9 illustrates various stages of a target stack including search context derived from the data mapping specification of FIG. 4a. Reference is now collectively drawn to FIGS. 4c, 8 and 9, where an example mapping of XML input data to the programming objects shown in FIG. 4b will be described.

To begin, the <ORDER> tag of mapping specification 40 of FIG. 4a is pushed onto the stack as shown by stack representation (a). Next, beginning at position (1), the map engine reads a first input node (e.g., the <ORDER> tag) from the XML instance document of FIG. 8. The input node that was read is then compared against the target nodes found within the top of the target stack. Since the input <ORDER> tag of the instance document literally matches the target <ORDER> node, the children of the matched target node in mapping specification 40 are then pushed onto the stack as shown by stack representation (b), and the read indicator of the instance document is advanced to position (2). The next input node is read from the instance document and is compared to the TOS target nodes of stack representation (b). Since a literal "CUSTOMER" match is found, the children of the matched target node are pushed onto the stack as shown by stack representation (c), and the read indicator of the instance document is advanced to position (3). The @ID="1" nomenclature is used in the example to represent the XMAttribute object found within the <CUSTOMER> tag of map specification 40. The next input node (e.g., ID="1") is read from the instance document and is compared to the TOS target nodes of stack representation (c). Since ID="1" is an attribute node and there is a XMAttribute object in the TOS target nodes with a matching name, the value "1" is assigned to the "C.ID" object, resulting in stack representation (d). Additionally, the position indicator is advanced to position (4). Since the <FAVCOLOR> input node does not match any of the TOS target nodes, the position indicator is moved to a position immediately following the end tag corresponding to the input node (5), and a new input node is selected. This effectively causes the non-matching input node to be skipped. Next, the <NAME> input node is read and compared against the TOS target nodes of stack representation (e). Since the <NAME> input node matches the <NAME> target node, the children of the matched node are pushed onto the stack. Accordingly, the value {C.NAME} is pushed onto the stack as shown by stack representation (e), and the position indicator is moved to position (6). Since {C.NAME} is an xm:value and "Jason" is a text node, the value of "Jason" is assigned to the C.NAME object and the position indicator is advanced to position (7). If the data type of the value read does not match the data type expected by the data object, a simple type conversion such as "toString" can be utilized. Since position (8) corresponds to an end tag, the target stack is popped and the position indicator is again advanced. At position (8) the <SHIPADDRESS> input node is read and matched with the <SHIPADDRESS> target node of stack representation (f), resulting in the push of the {c.address} XMValue object onto the stack and yielding stack representation (g). Since {c.address} is an XMValue object and position (10) indicates a text node, "1ST STREET" is assigned to c.address and the stack is popped. The above-described process will continue until no additional input nodes remain to be read in the instance document, or until all map specification directives have been processed.

In one embodiment of the invention, a marker is used to track which of the TOS target nodes an input node has been compared against. As the input node is compared against each of the TOS target nodes in order, the marker is advanced to point to the next TOS target node. In one embodiment, when the marker reaches the end of the list of TOS target nodes, it wraps around to indicate the first target node on the TOS. Accordingly, in situations where the order of XML tags is significant (e.g., where two elements have the same name, but have different contexts), the order of the input XML tags can be tracked and separate mapping rules used based on position. Similarly, in situations where the order of XML tags is not significant, the same implementation can be used just the same.

Objects-to-XML Mapping

In the Objects-to-XML mapping, an XML document fragment is built from a set of programming language objects as dictated by the map specification. In one embodiment, an annotated DOM representing the XML map specification is generated for use in generating the XML output. Certain annotation nodes, such as XMValue and XMAttribute objects will cause XML output to be generated based on the value of the programming language objects identified by the annotation nodes.

Figure 10A:
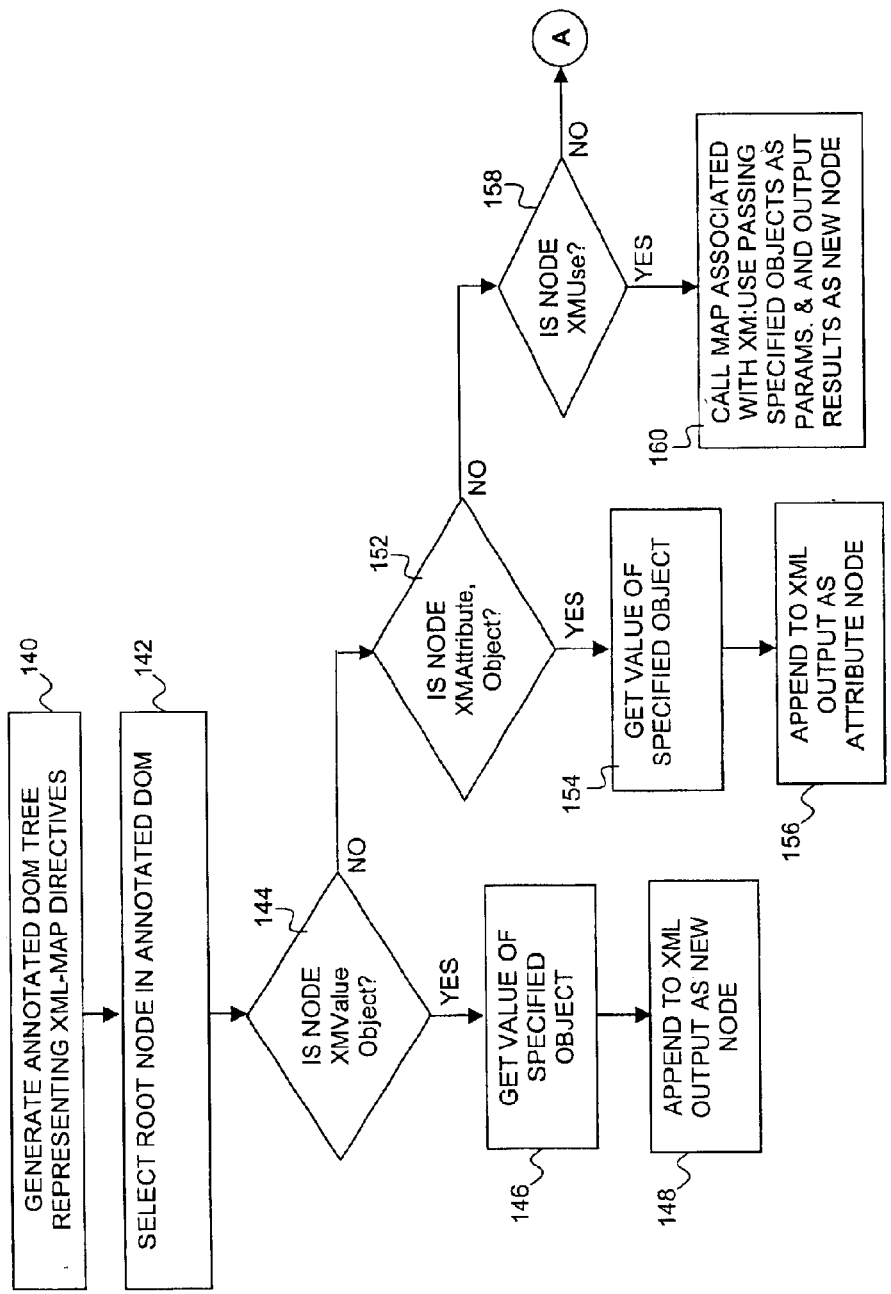
FIGS. 10a–b illustrates one embodiment of an operational flow associated with the Objects-to-XML mapping process, mapping programming language data objects to data elements of a XML data structure.
Figure 10B:
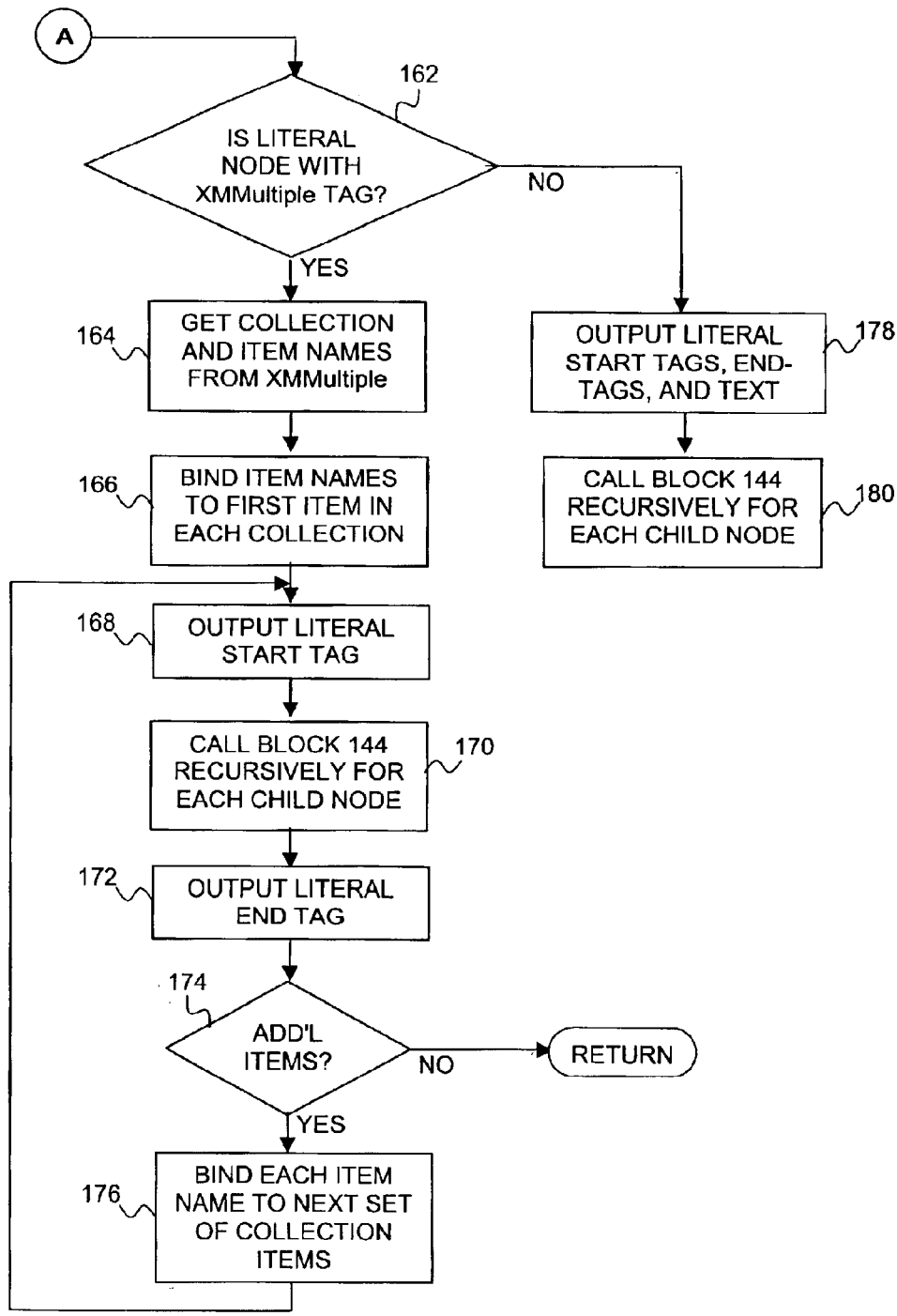

FIGS. 10a–b illustrate one embodiment of an operational flow associated with the Objects-to-XML mapping process. To begin, an annotated DOM tree representing XML-map directives is generated in much the same way the annotated DOM was generated in the XML-to-Objects process, block 140. Next, the nodes of the annotated DOM are traversed and processed in order starting with the root node. Each node of the annotated DOM is processed by determining if a selected node is an XMValue, block 144. If so, the object associated with the XMValue is retrieved and the result is appended to the output as an XML node, blocks 146 and 148. For simple object types, such as integers and Strings, the XML node appended to the output is a text node. For complex object types, in one embodiment the XML node appended to the output is an XML element node constructed using a simple isomorphic mapping. If, however, the selected node is not an XMValue, a determination is made as to whether the selected node is an XMAttribute, block 152. If so, the object associated with the XMAttribute is retrieved and the result is appended to the output as an XML attribute, blocks 154 and 156. If the selected node is not an XMValue or XMAttribute object, a determination is made as to whether the selected node is associated with an XMUse, block 158. If the selected node is associated with an XMUse, the external map associated with the XMUse is called passing the specified objects as parameters and the results of the map are then appended to the XML output, block 160. If the selected node is not an XMValue, XMAttribute, or XMUse, the selected node is a literal node and a determination is made as to whether the selected literal node contains a child node that is an XMMultiple object, block 152. If the selected literal node does not contain a child node that is a XMMultiple object, the literal content is directly output, block 178, and it's children are processed recursively, by calling block 144 for each child node, block 180. However, if the selected literal node contains an XMMultiple child node, the collections and item names associated with the XMMultiple object are identified, block 164. Each item name is then bound to the first item in the corresponding collection and the literal start tag associated with the XMMultiple object is output, blocks 166 and 168. At block 170, the map engine iterates over the child nodes, recursively appending each one to the XML output using the values of the collection items currently bound to the items names, before the literal end tag is output at block 172. At block 174, a determination is made as to whether there are any additional items remaining in the collections, block 174. If so, each item name is bound to the next set of collection items, block 176, and the process repeats, starting by outputting another instance of the literal start tag, block 168. If at block 174 it is determined that no additional items remain, the process ends.

Figure 11:
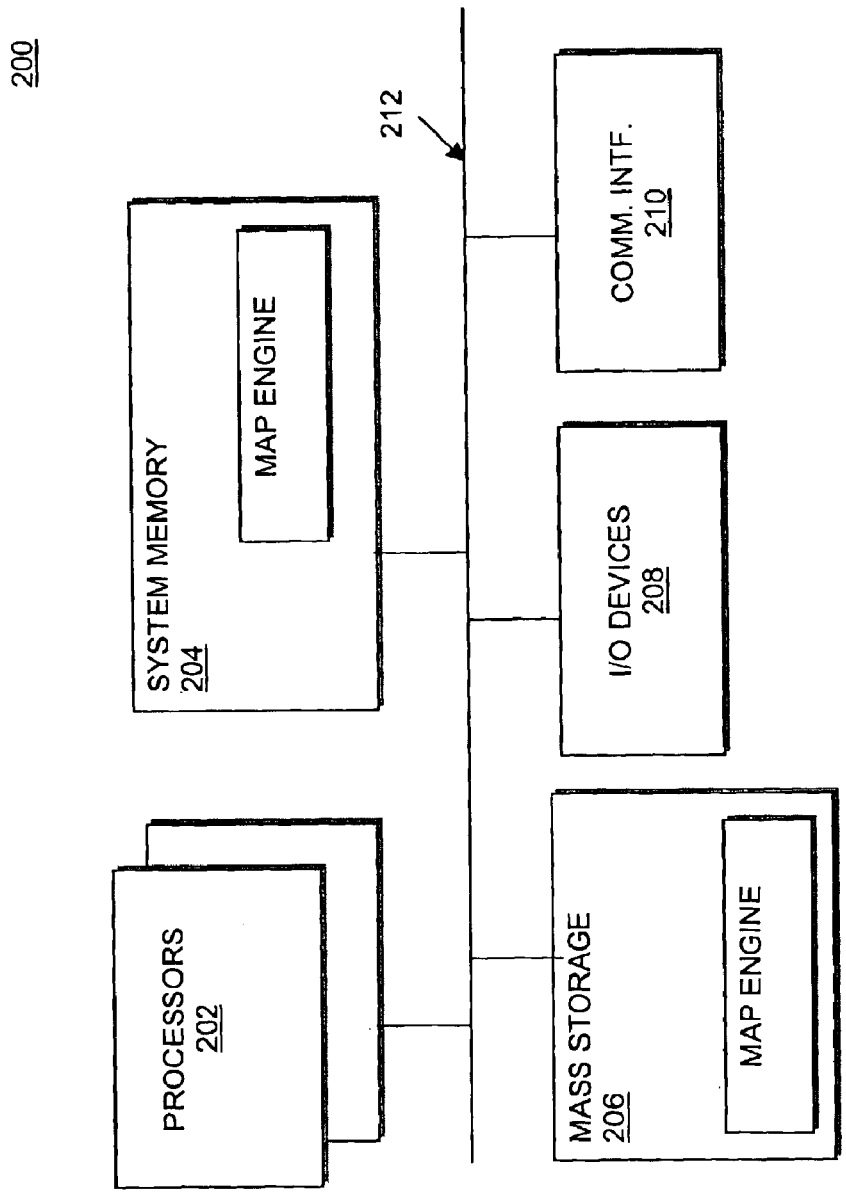
FIG. 11 illustrates an example computer system suitable for hosting the map engine and other related elements of the present invention.

FIG. 11 illustrates an example computer system suitable for hosting the map engine of the present invention. As shown, computer system 200 includes one or more processors 202, and system memory 204. Additionally, computer system 200 includes mass storage devices 206 (such as diskette, hard drive, CDROM and so forth), input/output devices 208 (such as keyboard, cursor control and so forth) and communication interfaces 210 (such as network interface cards, modems and so forth). The elements are coupled to each other via system bus 212, which represents one or more buses. In the case of multiple buses, they are bridged by one or more bus bridges (not shown). Each of these elements performs its conventional functions known in the art. In particular, system memory 204 and mass storage 206 are employed to store a working copy and a permanent copy of the programming instructions implementing the map engine of the present invention. The permanent copy of the programming instructions may be loaded into mass storage 206 in the factory, or in the field, through e.g. a distribution medium (not shown) or through communication interface 210 (from a distribution server (not shown). The constitution of these elements 202–212 are known, and accordingly will not be further described.

Conclusion and Epilogue

Thus, it can be seen from the above description, a declarative specification and engine for non-isomorphic data mapping has been described. While the present invention has been described referencing the illustrated and above enumerated embodiments, the present invention is not limited to these described embodiments. Numerous modification and alterations may be made, consistent with the scope of the present invention as set forth in the claims to follow. Thus, the above-described embodiments are merely illustrative, and not restrictive on the present invention.

What is claimed is:

1. A computer implemented method comprising:
  receiving a first mapping specification mapping data elements of a first data structure of a first data representation to data elements of a second data structure of a second data representation, the first data structure having a first one or more data elements and a first one or more data element relationships defining a first shape and the second data structure having a second one or more data elements and a second one or more data element relationships defining a second shape, where the first shape and the second shape are not equivalent;

receiving a first instance of said first data structure having first instances of said first one or more data elements of said first data structure; and populating data element instances of a first instance of said second data structure with values of said correspondingly mapped data element instances of said first instance of said first data structure in accordance with said first mapping specification.

2. The method of claim 1, where the method further comprises receiving a second instance of said first data structure having second instances of said first one or more data elements of said first data structure; and populating said data element instances of said first instance of said second data structure with values of said correspondingly mapped data element instances of said second instance of said first data structure in accordance with said first mapping specification.

3. The method of claim 1, where the method further comprises receiving a second instance of said second data structure having second instances of said second one or more data elements; and populating data element instances of a second instance of said first data structure with values of said correspondingly mapped data element instances of said second instance of said second data structure in accordance with said first mapping specification.

4. The method of claim 3, wherein said second instance of said second data structure comprises said populated data element instances of said second data structure.

5. The method of claim 4, wherein values of one or more of said data element instances of said populated data element instances of said second data structure are modified before populating said data element instances of said second instance of said first data structure.

6. The method of claim 1, wherein the method further comprises receiving a second mapping specification mapping data elements of said first data structure of said first data representation to data elements of a third data structure of a third data representation, the third data structure having a third one or more data elements and a third one or more data element relationships defining a third shape, where the first shape and the third shape are not equivalent; and populating said data element instances of a first instance of said third data structure with values of said correspondingly mapped data element instances of said first instance of said first data structure in accordance with said second mapping specification.

7. The method of claim 6, wherein said third data representation comprises a selected one of the Extended Mark-Up Language elements and Java objects.

8. The method of claim 1, wherein said second data representation comprises a selected one of Extended Mark-Up Language elements and Java objects.

9. The method of claim 1, wherein said first programming language comprises a selected one of Extended Mark-Up Language elements and the Java objects.

10. The method of claim 1, wherein at least one of said first and second data representations comprise Extended Mark-Up Language elements, and said first mapping specification comprises an instance of one of said first and second data representations comprising said Extended Mark-Up Language elements and including a plurality of mapping tags specifying said mapping of data elements of said first data structure to said data elements of said second data structure.

11. The method of claim 10, wherein said mapping tags comprise an identifier prefix identifying a mapping namespace where semantics of said mapping tags are defined.

12. The method of claim 10, wherein at least one of said mapping tags is expressed in a shorthand form.

13. The method of claim 12, wherein said shorthand form comprises usage of a plurality of special characters as delimiters.

14. The method of claim 13, wherein said special characters comprise "{" and "}".

15. The method of claim 10, wherein said mapping tags comprise a mapping tag specifying a mapping between an XML data element and a Java object.

16. The method of claim 10, wherein said mapping tags comprise a mapping tag specifying a mapping between an XML attribute and a Java object.

17. The method of claim 10, wherein said mapping tags comprise a mapping tag specifying a mapping of data between repeating XML tags and a Java collection object.

18. The method of claim 10, wherein said mapping tags comprise a mapping tag specifying a second mapping specification to be used to map a first subset of said mapping of said data elements of said first data structure to said data elements of said second data structure.

19. The method of claim 18, wherein said second mapping specification comprises a bi-directional mapping of said first subset of mapping of said data elements of said first data structure to said data elements of said second data structure.

20. The method of claim 18, wherein said second mapping specification comprises a first and a second unidirectional function performing said first subset of mapping of said data elements of said first data structure to said data elements of said second data structure in a first and a second mapping direction respectively.

21. The method of claim 20, wherein said first and second unidirectional functions are methods of a programming language class.

22. The method of claim 1, wherein said first and second data representations comprise Extended Mark-Up Language elements and Java objects respectively, and said populating operation comprises initializing empty objects for each collection type and complex type appearing in at least said first mapping specification;

generating an annotated DOM tree representing mapping directives of said first data mapping specification; and building data objects having corresponding values based at least in part on the annotated DOM tree representation.

23. The method of claim 22, wherein said initializing of empty objects is further based on a provided object type table.

24. The method of claim 22, wherein generating an annotated DOM further comprises:

selecting a node of the DOM tree;

determining if said node corresponds to a mapping directive specifying mapping between an XML data element and a Java object;

identifying an object name and object type associated with said directive and corresponding to said Java object, if said node corresponds to a mapping directive specifying mapping of an XML data element to said Java object; and creating a new object containing the identified object name and object type, and replacing the selected node with the new object.

25. The method of claim 22, wherein generating an annotated DOM further comprises:

selecting a node of the DOM tree;

determining if said node corresponds to a mapping directive specifying mapping between an XML attribute and a Java object;

identifying an attribute name, an object name and object type associated with said directive and corresponding to said Java object, if said node corresponds to a mapping directive specifying mapping of an XML attribute to a Java object; and creating a new object containing the identified attribute name, object name and object type, and replacing the selected node with the new attribute object.

26. The method of claim 22, wherein generating an annotated DOM further comprises:

selecting a node of the DOM tree;

determining if said node corresponds to a mapping directive specifying mapping between data within repeating XML tags and a Java collection object; and identifying one or more collection names, one or more item names, and one or more item types corresponding to the mapping directive specifying mapping between data within repeating XML tags and a Java collection object, if said node corresponds to a mapping directive specifying mapping between data within repeating XML tags and a Java collection object; and creating a new object containing said collection names, item names, and item types, and replacing the selected node with the new object.

27. The method of claim 22, wherein generating an annotated DOM further comprises:

selecting a node of the DOM tree;

determining if said node corresponds to a mapping directive specifying a second mapping specification to be used for a first subset of said mapping of said data elements of said first data structure to said data elements of said second data structure;

identifying a mapping signature of the selected node; and creating a new object containing said mapping signature, and replacing the selected node with the new object.

28. The method of claim 22, wherein building further comprises:

parsing said first instance of said XML data structure having first instances of said first one or more data elements of said XML data structure to generate an input-DOM tree representing XML data elements;

creating a new target-node stack having a top-of-stack (TOS) containing one or more target nodes corresponding to nodes of said annotated DOM;

comparing each of said one or more target nodes with a selected input node of said input-DOM tree to determine if a search rule matches the selected input node.

29. The method of 28, further comprising successively selecting each input node of said input-DOM tree and comparing each selected input node to each of said one or more target nodes.

30. The method of claim 28, further comprising:

selecting one of said one or more target nodes;

determining if said selected target node is a literal node matching said input node; and pushing children of the selected target node onto the target-node stack if said selected target node is a literal node matching said input node.

31. The method of claim 30, further comprising:

determining if said selected target node corresponds to an object containing one or more collection names, item names, and item types, and if so, creating a new item instance for each corresponding collection item described by said object.

32. The method of claim 31, wherein creating a new item instance comprises:

instantiating an item associated with a corresponding item type described by the object;

binding said instantiated item to a corresponding item name described by the object; and inserting said instantiated item into a corresponding collection described by the object.

33. The method of claim 28, further comprising:

selecting one of said one or more target nodes; and assigning a value associated with said selected input node to an object corresponding to said selected target node, if said selected input node is an attribute node and a name associated with the attribute node matches the attribute name contained by the object.

34. The method of claim 28, further comprising:

selecting one of said one or more target nodes;

determining if said selected target node is associated with a value mapping object and if said selected input node is a text node; and assigning a value associated with the text node to an object corresponding to the value object.

35. The method of claim 28, further comprising:

selecting one of said one or more target nodes;

determining if said selected target node corresponds to a second map specifying one or more objects within the second map signature;

passing the selected input node as a parameter to said second map if said selected target node corresponds to a second map specifying one or more objects within the second map signature; and assigning objects returned by the second map to objects specified in the second map signature.

36. The method of claim 28, wherein each of said one or more target nodes are compared with said selected input node of said input-DOM tree in order such that different search rules can be used on XML data elements based on their position within said input-DOM tree.

37. The method of claim 36, wherein a marker is used to track which of the one or more target nodes said selected input node has been compared against.

38. The method of claim 1, wherein said first and second data representations comprise Java objects and Extended Mark-Up Language elements respectively, and said populating operation comprises generating an annotated DOM tree representing XML-mapping directives of said first mapping specification;

traversing nodes of said annotated DOM tree representation in order, successively selecting and processing each node and child node in accordance with one or more XML-mapping directives corresponding to each said child node; and outputting and appending the results of said processing in terms of XML accordingly.

39. The method of claim 38, wherein said processing comprises determining whether a selected node comprises a mapping directive specifying an XML value or attribute, and if so, retrieving an object associated with said value or attribute, evaluating said object to obtain a result, and appending said result to said XML output using an appropriate XML output format based at least in part upon whether said mapping directive specifies an XML value or attribute.

40. The method of claim 38, wherein said processing comprises:
   determining whether a selected node corresponds to a second map specifying one or more objects within the second map signature;
   passing the one or more specified objects as parameters to the second map; and
   appending results of the second map to the XML output.

41. The method of claim 38, wherein said processing comprises:
   determining if a selected literal node contains a child node that corresponds to a directive specifying mapping for repeating XML elements;
   identifying a collection name and an item name associated with the corresponding directive;
   binding said item name to a first item in a collection corresponding to said collection name;
   outputting a literal start tag associated with said directive;
   recursively appending each child node to the XML output using a value corresponding to the collection item bound to said item name; and
   outputting a literal end tag associated with said directive.

42. The method of claim 38, wherein said processing of each child node comprises determining whether a selected child node comprises a mapping directive specifying usage of a second mapping specification comprising a pair of mapping functions, and if so, calling one of said mapping functions.

43. The method of claim 38, wherein said processing of each child node comprises determining whether the child node comprises a mapping directive specifying mapping for repeating XML data elements, and if so, iterating over corresponding collections to populate said repeating XML data elements.

44. A computer implemented method for populating data elements of a Java data structure comprising one or more data objects and one or more data object relationships defining a first shape, with values of corresponding data elements of a XML data structure having a second one or more data elements and one or more data element relationships defining a second shape, where the first shape and second shape are not equivalent, the method comprising:
   initializing empty objects for each collection type and complex type appearing in at least a mapping specification specifying mapping of said data elements of said XML data structure to corresponding data objects of said Java data structure;
   generating an annotated DOM tree representing mapping specifications of said data mapping specification; and
   building data objects having corresponding values based at least in part on the annotated DOM tree representation.

45. The method of claim 44, wherein said initializing of empty objects is further based on a provided object type table.

46. The method of claim 44, wherein annotating further comprises:
   selecting a node of the DOM tree;
   determining if said node corresponds to a mapping directive specifying mapping between an XML data element and a Java object;
   identifying an object name and object type associated with said directive and corresponding to said Java object, if said node corresponds to a mapping directive specifying mapping of an XML data element to said Java object; and
   creating a new object containing the identified object name and object type, and replacing the selected node with the new object.

47. The method of claim 44, wherein annotating further comprises:
   selecting a node of the DOM tree;
   determining if said node corresponds to a mapping directive specifying mapping between an XML attribute and a Java object;
   identifying an attribute name, an object name and object type associated with said directive and corresponding to said Java object, if said node corresponds to a mapping directive specifying mapping of an XML attribute to a Java object; and
   creating a new object containing the identified attribute name, object name and object type, and replacing the selected node with the new attribute object.

48. The method of claim 44, wherein annotating further comprises:
   selecting a node of the DOM tree;
   determining if said node corresponds to a mapping directive specifying mapping between data within repeating XML tags and a Java collection object; and
   identifying one or more collection names, one or more item names, and one or more item types corresponding to the mapping directive specifying mapping between data within repeating XML tags and a Java collection object, if said node corresponds to a mapping directive specifying mapping between data within repeating XML tags and a Java collection object; and
   creating a new object containing said collection names, item names, and item types, and replacing the selected node with the new object.

49. The method of claim 44, wherein annotating further comprises:
   selecting a node of the DOM tree;
   determining if said node corresponds to a mapping directive specifying a second mapping specification to be used for a first subset of said mapping of said data elements of said first data structure to said data elements of said second data structure;
   identifying a mapping signature of the selected node; and
   creating a new object containing said mapping signature, and replacing the selected node with the new object.

50. The method of claim 44, wherein building further comprises:
   parsing said first instance of said XML data structure having first instances of said first one or more data elements of said XML data structure to generate an input-DOM tree representing XML data elements;
   creating a new target-node stack having a top-of-stack (TOS) containing one or more target nodes corresponding to nodes of said annotated DOM;

comparing each of said one or more target nodes with a selected input node of said input-DOM tree to determine if a search rule matches the selected input node.

51. The method of 50, further comprising successively selecting each input node of said input-DOM tree and comparing each selected input node to each of said one or more target nodes.

52. The method of claim 50, further comprising:

selecting one of said one or more target nodes;

determining if said selected target node is a literal node matching said input node; and pushing children of the selected target node onto the target-node stack if said selected target node is a literal node matching said input node.

53. The method of claim 52, further comprising:

determining if said selected target node corresponds to an object containing one or more collection names, item names, and item types, and if so, creating a new item instance for each corresponding collection item described by said object.

54. The method of claim 53, wherein creating a new item instance comprises:

instantiating an item associated with a corresponding item type described by the object;

binding said instantiated item to a corresponding item name described by the object; and inserting said instantiated item into a corresponding collection described by the object.

55. The method of claim 50, further comprising:

selecting one of said one or more target nodes; and assigning a value associated with said selected input node to an object corresponding to said selected target node, if said selected input node is an attribute node, and a name associated with the attribute node matches the attribute name contained by the object.

56. The method of claim 50, further comprising:

selecting one of said one or more target nodes;

determining if said selected target node is associated with a value mapping object and if said selected input node is a text node; and assigning a value associated with the text node to an object corresponding to the value object.

57. The method of claim 50, further comprising:

selecting one of said one or more target nodes;

determining if said selected target node corresponds to a second map specifying one or more objects within the second map signature;

passing the selected input node as a parameter to said second map if said selected target node corresponds to a second map specifying one or more objects within the second map signature; and assigning objects returned by the second map to objects specified in the second map signature.

58. The method of claim 50, wherein each of said one or more target nodes are compared with said selected input node of said input-DOM tree in order such that different search rules can be used on XML data elements based on their position within said input-DOM tree.

59. The method of claim 58, wherein a marker is used to track which of the one or more target nodes said selected input node has been compared against.

60. A computer implemented method for populating data elements of a XML data structure having a first one or more data elements and one or more data element relationships defining a first shape, with values of corresponding data objects of a Java data structure having a second one or more data elements and data element relationships defining a second shape, where the first shape and second shape are not equivalent, the method comprising:

generating an annotated DOM tree representing XML-mapping directives of said first mapping specification;

traversing nodes of said annotated DOM tree representation in order, successively selecting and processing each child node; and outputting and appending the results of said processing according for XML values and XML attributes.

61. The method of claim 60, wherein said processing comprises determining whether a selected node comprises a mapping directive specifying an XML value or attribute, and if so, retrieving an object associated with said value or attribute, evaluating said object to obtain a result, and appending said result to said XML output using an appropriate XML output format based at least in part upon whether said mapping directive specifies an XML value or attribute.

62. The method of claim 60, wherein said processing comprises:

determining whether a selected node corresponds to a second map specifying one or more objects within the second map signature;

passing the one or more specified objects as parameters to the second map; and appending results of the second map to the XML output.

63. The method of claim 60, wherein said processing comprises:

determining if a selected literal node contains a child node that corresponds to a directive specifying mapping for repeating XML elements;

identifying a collection name and an item name associated with the corresponding directive;

binding said item name to a first item in a collection corresponding to said collection name;

outputting a literal start tag associated with said directive;

recursively appending each child node to the XML output using a value corresponding to the collection item bound to said item name; and outputting a literal end tag associated with said directive.

64. The method of claim 60, wherein said processing of each child node comprises determining whether a selected child node comprises a mapping directive specifying usage of a second mapping specification comprising a pair of mapping functions, and if so, calling one of said mapping functions.

65. The method of claim 60, wherein said processing of each child node comprises determining whether the child node comprises a mapping directive specifying mapping for repeating XML data elements, and if so, iterating over corresponding collections to populate said repeating XML data elements.

66. An article of manufacture comprising a storage medium having stored therein a plurality of programming instructions designed to program an apparatus to perform a data mapping, which programming instructions when executed enable the apparatus to receive a first mapping specification mapping data elements of a first data structure of a first data representation to data elements of a second data structure of a second data representation, the first data structure having a first one or more data elements and a first one or more data element relationships defining a first shape and the second data structure having a second one or more data elements and a second one or more data element relationships defining a second shape, where the first shape and the second shape are not equivalent;

receive a first instance of said first data structure having first instances of said first one or more data elements of said first data structure; and populate data element instances of a first instance of said second data structure with values of said correspondingly mapped data element instances of said first instance of said first data structure in accordance with said first mapping specification.

67. The article of claim 66, wherein the programming instructions further enable the apparatus to receive a second instance of said first data structure having second instances of said first one or more data elements of said first data structure; and populate said data element instances of said first instance of said second data structure with values of said correspondingly mapped data element instances of said second instance of said first data structure in accordance with said first mapping specification.

68. The article of claim 66, wherein the programming instructions further enable the apparatus to receive a second instance of said second data structure having second instances of said second one or more data elements; and populate data element instances of a second instance of said first data structure with values of said correspondingly mapped data element instances of said second instance of said second data structure in accordance with said first mapping specification.

69. The article of claim 68, wherein said second instance of said second data structure comprises said populated data element instances of said second data structure.

70. The article of claim 69, wherein values of one or more of said data element instances of said populated data element instances of said second data structure are modified before populating said data element instances of said second instance of said first data structure.

71. The article of claim 66, wherein the programming instructions further enable the apparatus to receive a second mapping specification mapping data elements of said first data structure of said first data representation to data elements of a third data structure of a third data representation, the third data structure having a third one or more data elements and a third one or more data element relationships defining a third shape, where the first shape and the third shape are not equivalent; and populate said data element instances of a first instance of said third data structure with values of said correspondingly mapped data element instances of said first instance of said first data structure in accordance with said second mapping specification.

72. The article of claim 71, wherein said third data representation comprises a selected one of the Extended Mark-Up Language elements and Java objects.

73. The article of claim 66, wherein said second data representation comprises a selected one of Extended Mark-Up Language elements and Java objects.

74. The article of claim 66, wherein said first programming language comprises a selected one of Extended Mark-Up Language elements and the Java objects.

75. The article of claim 66, wherein at least one of said first and second data representations comprise Extended Mark-Up Language elements, and said first mapping specification comprises an instance of one of said first and second data representations comprising said Extended Mark-Up Language elements and including a plurality of mapping tags specifying said mapping of data elements of said first data structure to said data elements of said second data structure.

76. The article of claim 75, wherein said mapping tags comprise an identifier prefix identifying a mapping namespace where semantics of said mapping tags are defined.

77. The article of claim 75, wherein at least one of said mapping tags is expressed in a shorthand form.

78. The article of claim 77, wherein said shorthand form comprises usage of a plurality of special characters as delimiters.

79. The article of claim 78, wherein said special characters comprise "{" and "}".

80. The article of claim 75, wherein said mapping tags comprise a mapping tag specifying a mapping between an XML data element and a Java object.

81. The article of claim 75, wherein said mapping tags comprise a mapping tag specifying a mapping between an XML attribute and a Java object.

82. The article of claim 75, wherein said mapping tags comprise a mapping tag specifying a mapping of data between repeating XML tags and a Java collection object.

83. The article of claim 75, wherein said mapping tags comprise a mapping tag specifying a second mapping specification to be used to map a first subset of said mapping of said data elements of said first data structure to said data elements of said second data structure.

84. The article of claim 83, wherein said second mapping specification comprises a bi-directional mapping of said first subset of mapping of said data elements of said first data structure to said data elements of said second data structure.

85. The article of claim 83, wherein said second mapping specification comprises a first and a second unidirectional function performing said first subset of mapping of said data elements of said first data structure to said data elements of said second data structure in a first and a second mapping direction respectively.

86. The article of claim 85, wherein said first and second unidirectional functions are methods of a programming language class.

87. The article of claim 66, wherein said first and second data representations comprise Extended Mark-Up Language elements and Java objects respectively, and said populating operation comprises initializing empty objects for each collection type and complex type appearing in at least said first mapping specification;

generating an annotated DOM tree representing mapping directives of said first data mapping specification; and building data objects having corresponding values based at least in part on the annotated DOM tree representation.

88. The article of claim 87, wherein said initializing of empty objects is further based on a provided object type table.

89. The article of claim 87, wherein said generating an annotated DOM further comprises:

selecting a node of the DOM tree;

determining if said node corresponds to a mapping directive specifying mapping between an XML data element and a Java object;

identifying an object name and object type associated with said directive and corresponding to said Java object, if said node corresponds to a mapping directive specifying mapping of an XML data element to said Java object; and creating a new object containing the identified object name and object type, and replacing the selected node with the new object.

90. The article of claim 87, wherein generating an annotated DOM further comprises:

selecting a node of the DOM tree;

determining if said node corresponds to a mapping directive specifying mapping between an XML attribute and a Java object;

identifying an attribute name, an object name and object type associated with said directive and corresponding to said Java object, if said node corresponds to a mapping directive specifying mapping of an XML attribute to a Java object; and creating a new object containing the identified attribute name, object name and object type, and replacing the selected node with the new attribute object.

91. The article of claim 87, wherein generating an annotated DOM further comprises:

selecting a node of the DOM tree;

determining if said node corresponds to a mapping directive specifying mapping between data within repeating XML tags and a Java collection object; and identifying one or more collection names, one or more item names, and one or more item types corresponding to the mapping directive specifying mapping between data within repeating XML tags and a Java collection object, if said node corresponds to a mapping directive specifying mapping between data within repeating XML tags and a Java collection object; and creating a new object containing said collection names, item names, and item types, and replacing the selected node with the new object.

92. The article of claim 87, wherein generating an annotated DOM further comprises:

selecting a node of the DOM tree;

determining if said node corresponds to a mapping directive specifying a second mapping specification to be used for a first subset of said mapping of said data elements of said first data structure to said data elements of said second data structure;

identifying a mapping signature of the selected node; and creating a new object containing said mapping signature, and replacing the selected node with the new object.

93. The article of claim 87, wherein said building operation further comprises:

parsing said first instance of said XML data structure having first instances of said first one or more data elements of said XML data structure to generate an input-DOM tree representing XML data elements;

creating a new target-node stack having a top-of-stack (TOS) containing one or more target nodes corresponding to nodes of said annotated DOM;

comparing each of said one or more target nodes with a selected input node of said input-DOM tree to determine if a search rule matches the selected input node.

94. The article of claim 93, wherein the plurality of programming instructions further enable the apparatus to successively select each input node of said input-DOM tree and compare each selected input node to each of said one or more target nodes.

95. The article of claim 93, wherein the programming instructions further enable the apparatus to select one of said one or more target nodes;

determine if said selected target node is a literal node matching said input node; and push children of the selected target node onto the target-node stack if said selected target node is a literal node matching said input node.

96. The article of claim 95, wherein the programming instructions further enable the apparatus to determine if said selected target node corresponds to an object containing one or more collection names, item names, and item types, and if so, create a new item instance for each corresponding collection item described by said object.

97. The article of claim 96, wherein said programming instructions to create a new item instance comprises programming instructions to instantiate an item associated with a corresponding item type described by the object;

bind said instantiated item to a corresponding item name described by the object; and insert said instantiated item into a corresponding collection described by the object.

98. The article of claim 93, wherein the programming instructions further enable the apparatus to select one of said one or more target nodes; and assign a value associated with said selected input node to an object corresponding to said selected target node, if said selected input node is an attribute node and a name associated with the attribute node matches the attribute name contained by the object.

99. The article of claim 93, wherein the programming instructions further enable the apparatus to select one of said one or more target nodes;

determine if said selected target node is associated with a value mapping object and if said selected input node is a text node; and assign a value associated with the text node to an object corresponding to the value object.

100. The article of claim 93, wherein the programming instructions further enable the apparatus to select one of said one or more target nodes;

determine if said selected target node corresponds to a second map specifying one or more objects within the second map signature;

pass the selected input node as a parameter to said second map if said selected target node corresponds to a second map specifying one or more objects within the second map signature; and assign objects returned by the second map to objects specified in the second map signature.

101. The article of claim 93, wherein each of said one or more target nodes are compared with said selected input node of said input-DOM tree in order such that different search rules can be used on XML data elements based on their position within said input-DOM tree.

102. The article of claim 101, wherein a marker is used to track which of the one or more target nodes said selected input node has been compared against.

103. The article of claim 66, wherein said first and second data representations comprise Java objects and Extended Mark-Up Language elements respectively, and said populating operation comprises generating an annotated DOM tree representing XML-mapping directives of said first mapping specification;

traversing nodes of said annotated DOM tree representation in order, successively selecting and processing each node and child node in accordance with one or more XML-mapping directives corresponding to each said child node; and outputting and appending the results of said processing in terms of XML accordingly.

104. The article of claim 103, wherein said processing comprises determining whether as selected node comprises a mapping directive specifying an XML value or attribute, and if so, retrieving an object associated with said value or attribute, evaluating said object to obtain a result, and appending said result to said XML output using an appropriate XML output format based at least in part upon whether said mapping directive specifies an XML value or attribute.

105. The article of claim 103, wherein said processing comprises:

determining whether a selected node corresponds to a second map specifying one or more objects within the second map signature;

passing the one or more specified objects as parameters to the second map; and appending results of the second map to the XML output.

106. The article of claim 103, wherein said processing comprises:

determining if a selected literal node contains a child node that corresponds to a directive specifying mapping for repeating XML elements;

identifying a collection name and an item name associated with the corresponding directive;

binding said item name to a first item in a collection corresponding to said collection name;

outputting a literal start tag associated with said directive;

recursively appending each child node to the XML output using a value corresponding to the collection item bound to said item name; and outputting a literal end tag associated with said directive.

107. The article of claim 103, wherein said processing of each child node comprises determining whether a selected child node comprises a mapping directive specifying usage of a second mapping specification comprising a pair of mapping functions, and if so, calling one of said mapping functions.

108. The article of claim 103, wherein said processing of each child node comprises determining whether the child node comprises a mapping directive specifying mapping for repeating XML data elements, and if so, iterating over corresponding collections to populate said repeating XML data elements.

* * * * *

UNITED STATES PATENT AND TRADEMARK OFFICE
CERTIFICATE OF CORRECTION

PATENT NO. : 6,859,810 B2 Page 1 of 1
APPLICATION NO. : 10/150436
DATED : February 22, 2005
INVENTOR(S) : Cezar Christian Andrei, Adam Bosworth and David Bau, III It is certified that error appears in the above-identified patent and that said Letters Patent is hereby corrected as shown below:

Column 1
Line 17, "EXtensible..." should read --Extensible...--.

Column 3
Line 13, "...term processor include..." should read --...term processor includes...--.

Column 5
Line 41, "...it's type..." should read --...its type...--.

Column 11
Line 7, "...position (10)..." should read --...position (9)...--.

Column 12
Line 4, "...it's children..." should read --...its children...--.

Signed and Sealed this

Twenty-seventh Day of March, 2007

JON W. DUDAS
*Director of the United States Patent and Trademark Office*